United States Patent [19]
Yamamoto

[11] Patent Number: 6,078,415
[45] Date of Patent: *Jun. 20, 2000

[54] NETWORK SYSTEM FOR COMMUNICATION WITH PLURAL CHANNELS, NODE DEVICE AND CONCENTRATOR FOR USE THEREIN, AND COMMUNICATION METHOD FOR SAID NETWORK SYSTEM

[75] Inventor: Mitsuru Yamamoto, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/573,123

[22] Filed: Dec. 15, 1995

[30] Foreign Application Priority Data

Dec. 16, 1994 [JP] Japan .................................. 6-313284

[51] Int. Cl.$^7$ .................................................. H04J 14/02
[52] U.S. Cl. ........................................... 359/128; 359/125
[58] Field of Search .................................. 359/123, 125, 359/128, 137, 139; 370/352, 355, 436, 478

[56] References Cited

U.S. PATENT DOCUMENTS

| | | | |
|---|---|---|---|
| 4,831,616 | 5/1989 | Huber ...................................... | 359/137 |
| 5,303,078 | 4/1994 | Brackett et al. ......................... | 359/128 |

FOREIGN PATENT DOCUMENTS

| | | |
|---|---|---|
| 0369802 | 5/1990 | European Pat. Off. . |
| 0497005 | 9/1992 | European Pat. Off. . |

OTHER PUBLICATIONS

Takashi Nakashima et al: "Photonic Access Network Architecture" Count–Down to the New Milennium, Phoenix, Dec. 2–5, 1991, vol. 1, Dec. 2, 1991, pp. 602–606, XPOOO326036, Institute Of Electrical and Electronics Engineers.

Irshid M I et al.: "A WDM Cross–Connected Star Topology for Multihop Lightwave Networks", Journal of Lightwave Technology, vol. 10, No. 6, Jun. 1, 1992, pp. 828–835, XP000293265.

Eng KY: "A Multi–Fiber Ring Architecture for Distributed Lightwave Networks" Digital Technology—Spanning the Universe, Philadelphia, Jun. 12–15, 1988, vol. 3, Jun. 12, 1988, pp. 1490–1496, XP000010891, Institute Of Electrical and Electronics Engineers, p. 1491.

Yuji Oie et al: "Rooknet: A Switching Network for High Speed Communication", IEICE Transactions on Communications, vol. E77–B, No. 2, Feb. 1, 1994, pp. 139–145, XP000447104.

*Primary Examiner*—Kinfe-Michael Negash
*Attorney, Agent, or Firm*—Fitzpatrick, Cella, Harper & Scinto

[57] ABSTRACT

In a network system providing communication through a multi-channel transmission path with n channels, N buffers in each of plural node devices temporarily store signals for transmission through the n channels. A channel control device alters the channels through which the signals from the buffers are sent so that the signals from plural buffers cannot be sent concurrently to the same channel. A buffer control device controls the read out of signals from the buffers through the n channels selected for signal transmission synchronously with the channel alteration. A node device receiving signals from another node device includes reception devices that receive signals from the n channels, respectively.

110 Claims, 18 Drawing Sheets

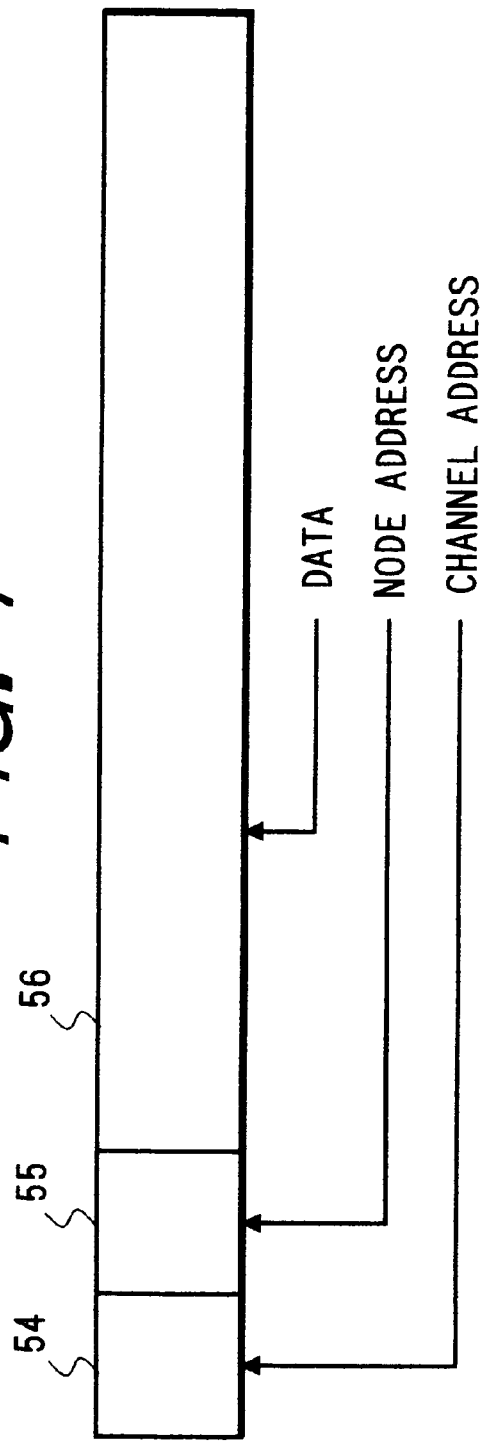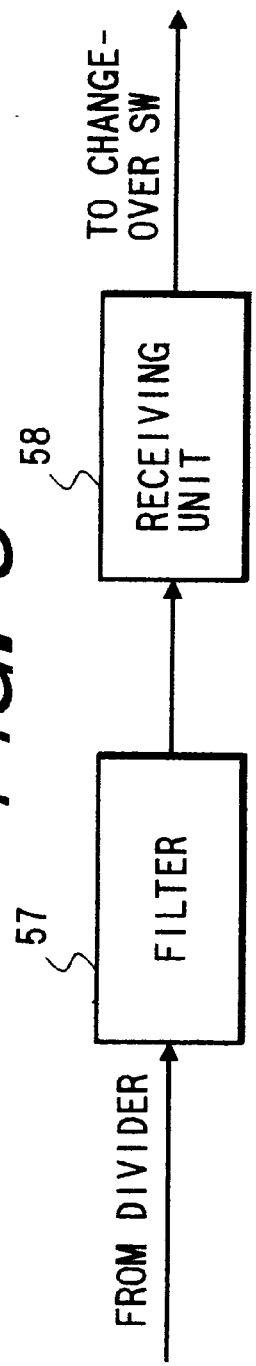

NETWORK SYSTEM FOR COMMUNICATION WITH PLURAL CHANNELS, NODE DEVICE AND CONCENTRATOR FOR USE THEREIN, AND COMMUNICATION METHOD FOR SAID NETWORK SYSTEM

BACKGROUND OF THE INVENTION

1. Field of the Invention

The present invention relates to a network system for communication of a signal, particularly a packet, among terminals connected thereto, a node device adapted for use in said network system and a communication method adapted for use in said network system. In particular, said network system employs a multi-channel transmission path.

2. Related Background Art

With the recent progress in the processing speed of terminals, there is being investigated a network system, utilizing a network consisting of multi-channel transmission paths, for realizing a faster process in the network connecting such terminals. As shown in FIG. 1, such network system is composed of node devices 120 for connecting plural terminals 126, 127, and a multi-channel transmission path 128 with plural channels, for connecting said node devices. In FIG. 1, the multi-channel transmission path consists, as an example, of a wavelength multiplex transmission path employing plural wavelengths.

In the network system shown in FIG. 1, a packet transmitted from the terminal 126 and entered into an input I/F unit 124 is switched in an exchange unit 122 to one of plural fixed wavelength transmission units 123 and is transmitted therein with a predetermined wavelength. It is then subjected to a relay process by any node device present in the path to a node device to which a destination terminal is connected. It is finally received by a fixed wavelength reception unit 121 of the destination node device, then is switched by an exchange unit so as to be released from an output I/F unit 125 to which a destination terminal is connected, thus released from the predetermined output I/F unit and received by the terminal. The exchange unit 122 of the node device sets the route for the packet to the desired terminal of the desired node device, by an exchange operation for sending the input packet to one of plural fixed wavelength transmission units and plural I/F units.

In such conventional configuration, the exchange unit is constructed in the following manner.

FIG. 2 shows an example of configuration of the exchange unit for use in such conventional example, representing a cross-bar exchange with N inputs and N outputs, wherein said number N of the inputs is equal to the sum of the number of the fixed wavelength reception units and the number of the input I/F units, and the number N of the outputs is equal to the sum of the number of the fixed wavelength transmission units and the number of the output I/F units.

In FIG. 2, 129 indicates a decoder for reading an address section of the packet and generating output designation data for indicating the destination of the packet to a control unit. 130 indicates a FIFO (first-in-first-out) register for temporarily storing the input packet and releasing said packet in the order of input to an output line, under the control by the control unit. 131-1 to 131-n indicate input lines serving to supply packet signals, released from the FIFO registers, to switch input terminals. 132 indicates a switch for switching whether or not to supply the packet signal, supplied from an input line, to an output line. For an input number N and an output number N, there are required N×N switches. 133 indicates a control unit for effecting read-out control of the FIFO registers and control of the switches, according to the output designation data from the decoder. 134-1 to 134-n indicate output lines for supplying the packet signals, released from the switches, to respective output units.

FIG. 3 shows the configuration of the packet exchanged in such packet exchange devices, and said packet is composed of an address section 135 indicating the destination terminal of the packet and a data section 136 indicating the data transmitted by said packet.

FIG. 4 shows an example of the decoder unit for decoding addresses of all (n) terminals connected to the network system.

Referring to FIG. 4, a latch 137 temporarily stores the destination address section of the input packet. Memories 138 of a number n respectively store, in advance by an unrepresented decoder management unit, addresses of all the terminals of a number n connected to the network system. Each of comparators 139 compares the destination address of the packet temporarily stored in the latch, with the address stored in each memory, and, in case of coincidence, sends a coincidence signal to a table address generator 140, which generates a table address for reading an output designation table. An output designation table 141 stores output designation data indicating the on-off operations of the switches. In response to an instruction from the table address generator, desired output designation data are read from said table and supplied to the control unit 133. The table address generated by the table address generator is to read data of the table corresponding to the number of the comparator which has generated the coincidence signal, so that the output designation data are read from the table corresponding to the destination address of the entered packet. Based on said output designation data, the switches 132 are operated and the packet entered from the input terminal is released from a predetermined output terminal.

As explained in the foregoing, the conventional configuration has been associated with a first drawback that a high cost is required for connection of the terminal to the network, as each node device has to be equipped with an expensive exchange unit with a large hardware magnitude.

Also the exchange unit requires N×N switches for N inputs and N outputs, and said number N of inputs is selected equal to the sum of the number of the fixed wavelength reception units and that of the input I/F units while said number N of outputs is selected equal to the sum of the number of the fixed wavelength transmission units and that of the output I/F units. Consequently there has existed a second drawback that the number of switches increases with a rate of square and the magnitude of hardware increases significantly with the increase in the number of the channels in the multi-channel transmission path or of the connected terminals.

Furthermore there has existed another drawback as explained in the following. In the decoder of the conventional configuration, as explained in the foregoing, the destination address of the packet is compared with the addresses of all the terminals connected to the network system, and the output designation data are read from the output designation table based on the coinciding terminal address. Consequently there are required sets of memory and comparator of a number at least equal to the number of the terminals connected to the network, and there are also required output designation tables of a same number. Also the table address generator requires a longer time for generating the table address, with the increase in the number of the coincidence signals to be entered. Consequently the decoder of the conventional configuration has been associated with a third drawback that, with the increase in the number of the terminals connected to the network system, the node device becomes expensive because of the increased hardware magnitude and the network system becomes unable to operate at a high speed as the high-speed address decoding becomes difficult.

SUMMARY OF THE INVENTION

In consideration of the foregoing, an object of the present invention is to simplify the structure of the exchange unit in the conventional node device, also to prevent increase in the hardware magnitude of the node device and to provide an inexpensive node device.

Another object of the present invention is to provide an improved node device, an improved network system and an improved transmission control method, capable of operation with a higher speed and with a smaller hardware magnitude, by simplifying the decoder unit which has hindered improvement in the throughput of the network system.

Still another object of the present invention is to reduce the cost required for connection of the terminal to the network system, by enabling connection, to the network system, of the inexpensive node device without exchange unit, therefore with a smaller hardware magnitude.

The above-mentioned objects can be attained, according to the present invention, by the following network systems.

According to the present invention, there is provided a first network system for effecting communication utilizing a multi-channel transmission path consisting of plural n channels, comprising:

separation means connected to a channel in said multi-channel transmission path and adapted to separate, from said connected channel, a desired signal among the signals on said connected channel; and input/output connection alteration means provided with n input terminals connected to the channels of said multi-channel transmission path and n output terminals connected to the channels of said multi-channel transmission path and adapted to release the signal entered from each channel to a channel different from the input channel.

In the above-mentioned configuration, the exchange function can be attained with a simpler structure, since the signal exchange in the network system utilizing the multi-channel transmission path can be divided into the exchange among channels by said input/output connection alteration means and the exchange on each channel by the separation means.

Also for achieving such divided or dispersed exchange in more efficient manner, said signal can be a signal having a destination address, which is composed of a channel address indicating the channel to which the separation means for separating said signal is connected and a separation means address indicating the separation means which is to be used for separating said signal.

Said input/output connection alteration means can be composed of a switch which can deliver the signal, entered from the input terminal, to an arbitrary output terminal, or means which is incapable of delivering the signal to an arbitrary output terminal but capable of delivering the signal to an output terminal not corresponding to the input terminal.

Also for improving the efficiency, said signal can be a signal having a destination address, and said input/output connection alteration means can be adapted, in delivering said signal to the channel connected to the separation means to be used for separation, to attach, to said signal, effectiveness information indicating that the destination address of said signal is effective. In such configuration, the separation means can discriminate whether the entered signal is already transmitted in the predetermined channel, by simply referring to said effectiveness information, so that the efficiency can be improved.

Also there may be adopted a configuration provided, as the means for entering signal to the channels, with means for inserting the signal, connected to the channels.

Furthermore, said separation means and/or the insertion means may be provided in the node device. The separation means and the insertion means provided in the node device may be provided either corresponding to all the channels or to a part of the channels. In the latter case, however, in order to enable signal exchange among all the channels, the input/output connection alteration means has to be connected to all the channels. In case said separation means is provided in the node device, there may be provided a node address, as the separation means address indicating the separation means to be used for separation of the signal.

Also said input/output connection alteration means may be provided in any position as long as the signal exchange among channels is rendered possible, namely within the node device, or outside thereof or in each node device. Within the network, there is required only one input/output connection alteration means if it can communicate with all the channels.

Also if the multi-channel transmission path is a multiplex transmission path utilizing multiplexing means, there are provided reception means and transmission means for each channel according to the necessity.

The multiplexing means can be various, such as so-called spatial multiplexing method utilizing different transmission paths respectively for the different channels, or a wavelength multiplexing method utilizing a transmission path as the multi-channel transmission path by assigning respectively different wavelengths to the channels.

Furthermore, there may be adopted a configuration in which said multi-channel transmission path, separation means and input/output connection alteration means are provided in a concentrator.

The present invention also provide a node device, a concentrator and a communication method adapted for use in the network system as explained in the foregoing.

BRIEF DESCRIPTION OF THE DRAWINGS

FIG. 7 is a view showing the configuration of a packet in the first embodiment of the present invention;

FIG. 8 is a view showing the configuration of a fixed wavelength reception unit in the first embodiment of the present invention;

DESCRIPTION OF THE PREFERRED EMBODIMENTS

Embodiment 1

Figure 5:
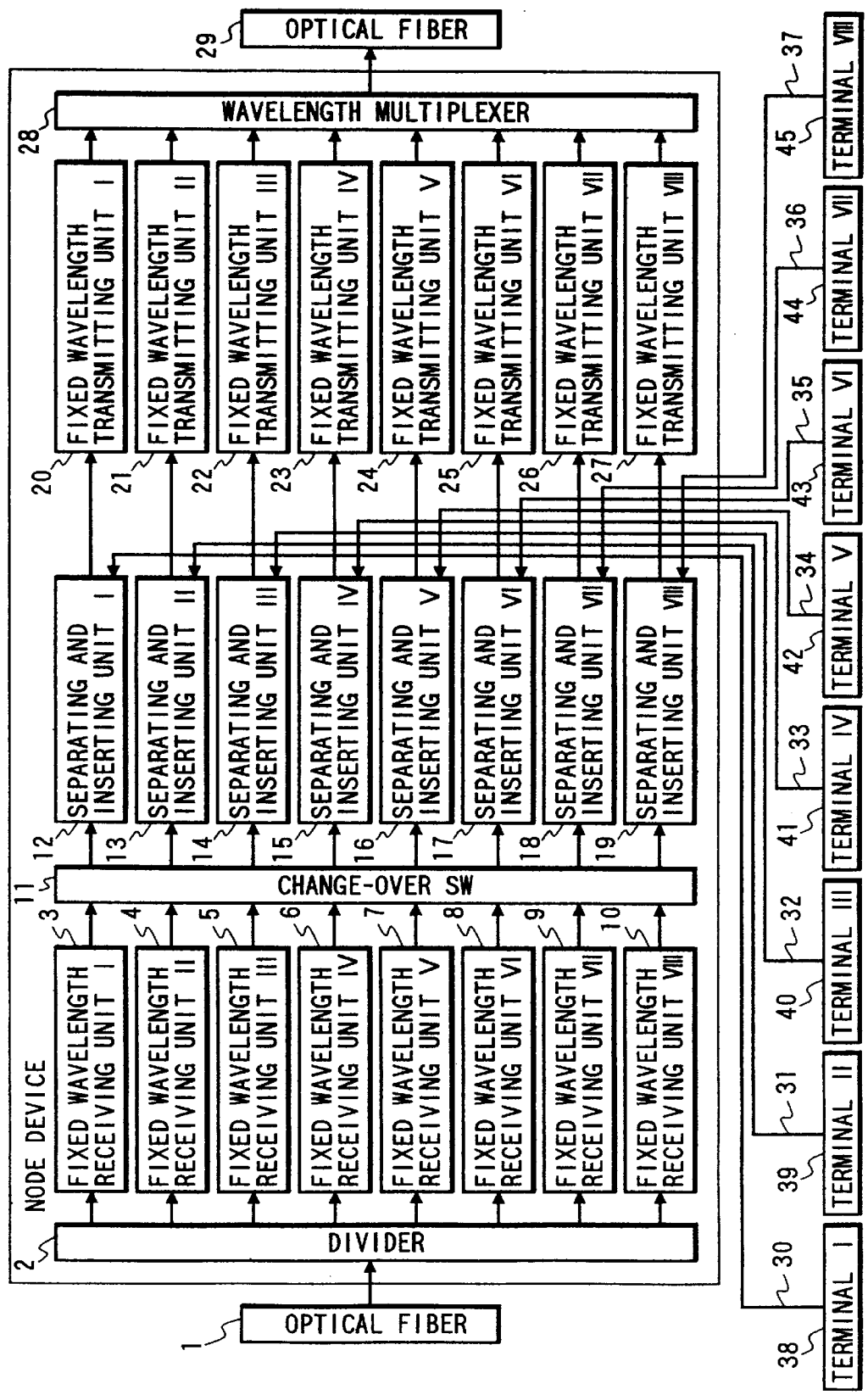
FIG. 5 is a view showing the configuration of a node device constituting a first embodiment of the present invention.

FIG. 5 shows a node device constituting a first embodiment of the present invention and adapted to be connected to eight terminals, in a network system utilizing a multi-channel transmission path with eight channels by optical wavelength multiplexing with 8 wavelengths ($\lambda 1$, $\lambda 2$, $\lambda 3$, $\lambda 4$, $\lambda 5$, $\lambda 6$, $\lambda 7$, $\lambda 8$).

Figure 6:
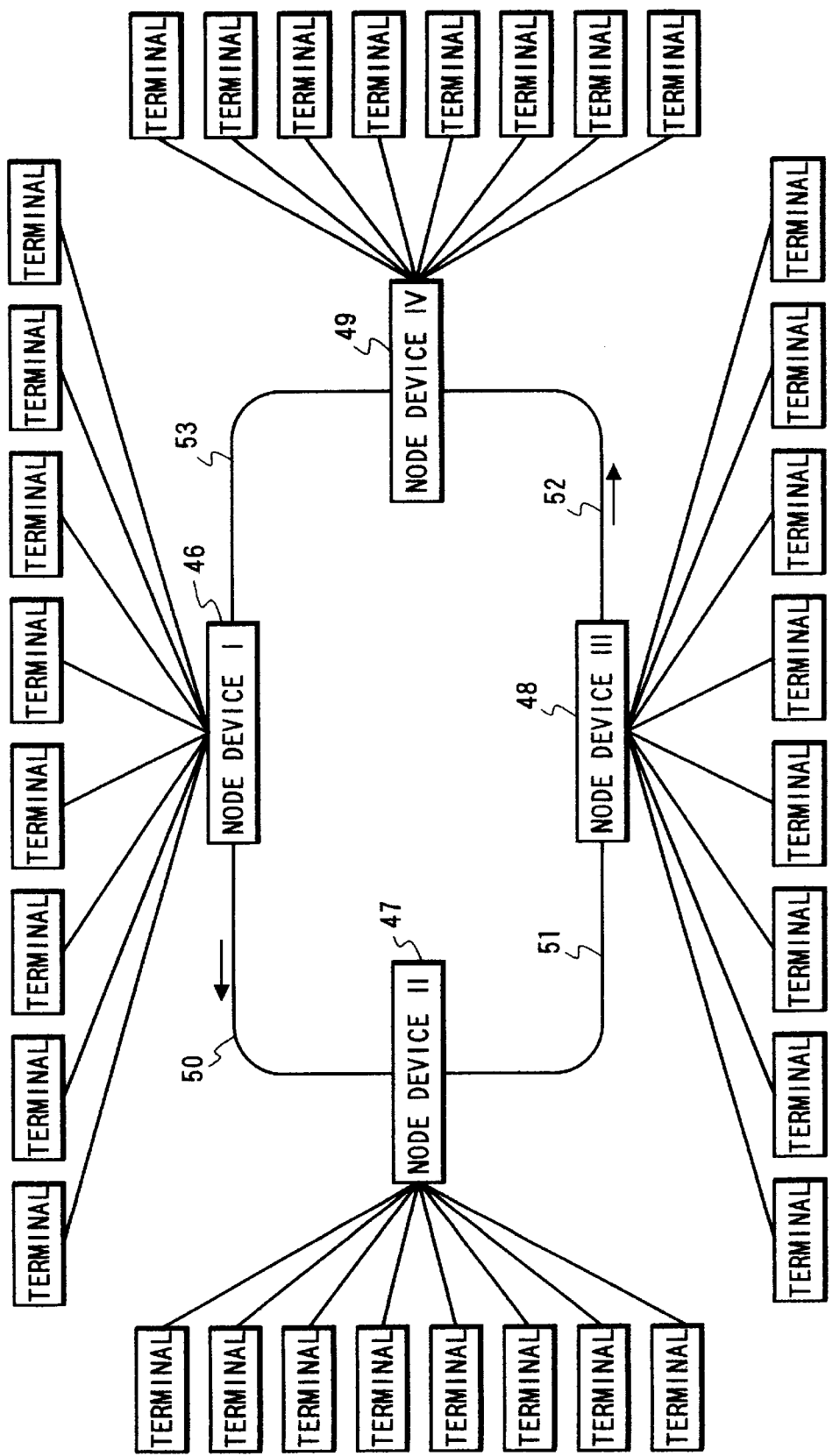
FIG. 6 is a view showing the configuration of a network system constituting a first embodiment of the present invention.

FIG. 6 shows an example of the network system utilizing the node devices of the first embodiment of the present invention shown in FIG. 5, wherein four node devices are connected in a ring structure with optical fibers. Arrows indicate the direction of transmission of packet, and each of the four node devices has the internal structure shown in FIG. 5.

Figure 1:
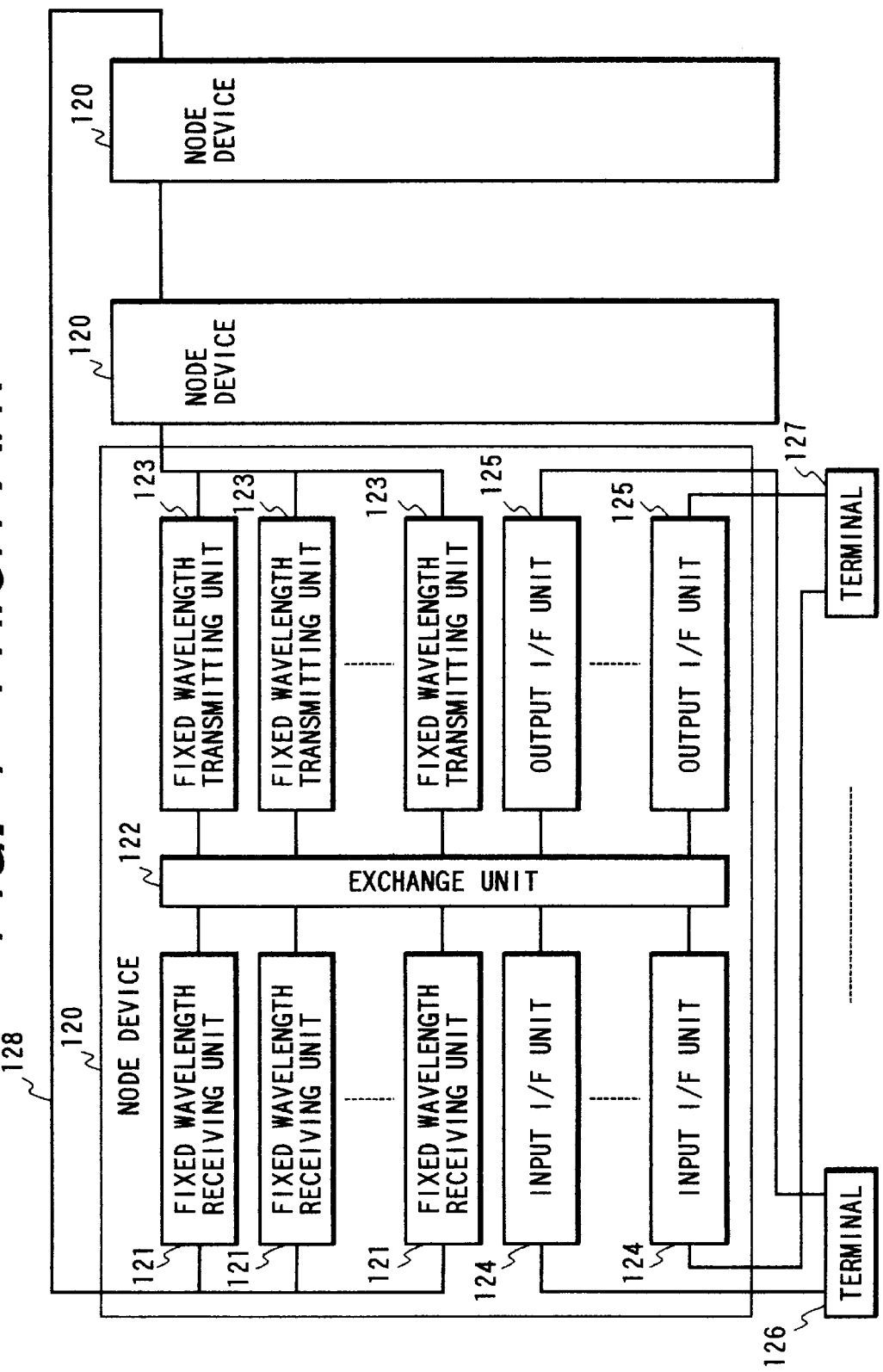
FIG. 1 is a view showing a conventional configuration.
Figure 2:
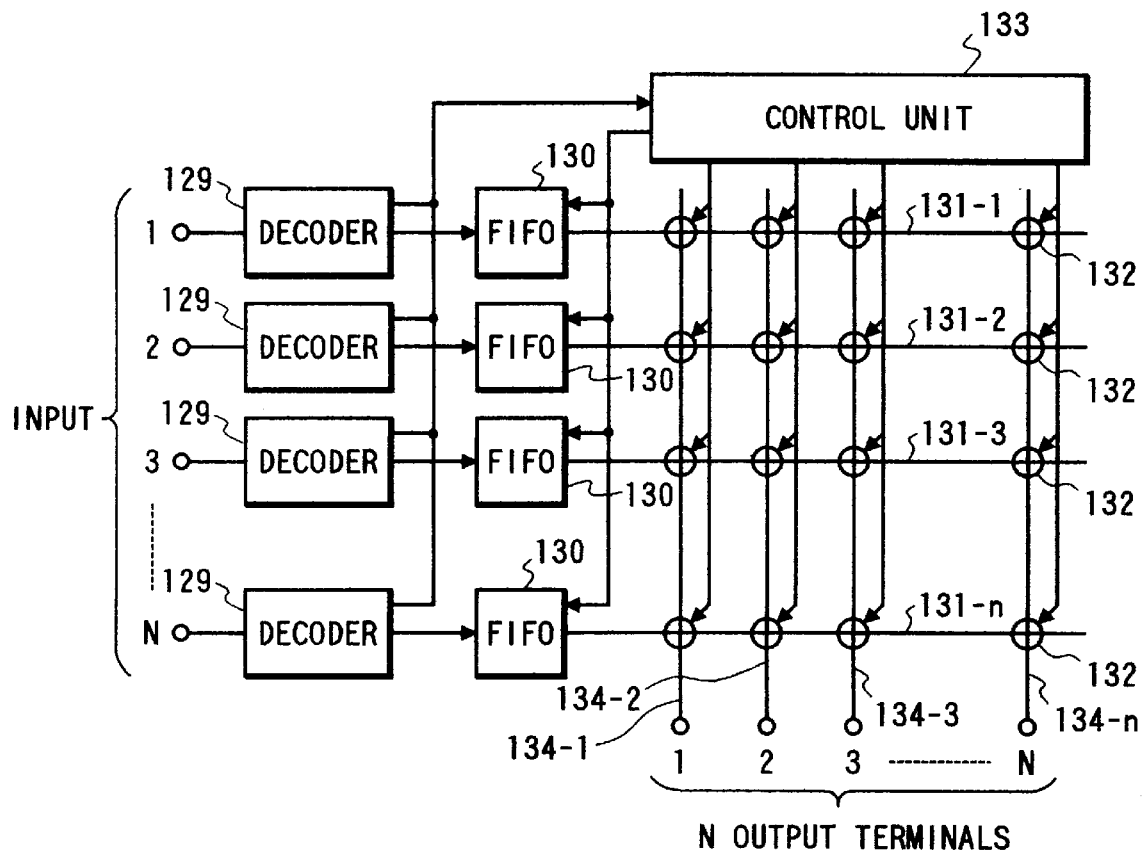
FIG. 2 is a view showing a conventional 8×8 switch array.
Figure 3:
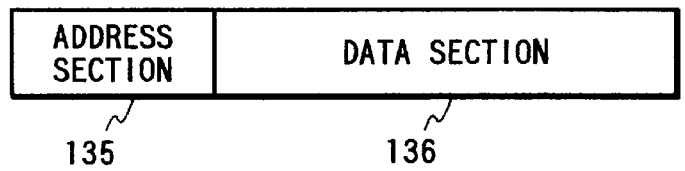
FIG. 3 is a view showing the configuration of a conventional packet.

Referring to FIG. 5, an optical fiber 1, constituting the physical medium of the optical wavelength multiplex transmission path, serves as the transmission medium of the multi-channel transmission path between a wavelength multiplexer 28 of an adjacent upstream node device and a divider 2 of this node device, and has channels with wavelengths $\lambda 1$, $\lambda 2$, $\lambda 3$, $\lambda 4$, $\lambda 5$, $\lambda 6$, $\lambda 7$, $\lambda 8$. A divider 2 divides the optical signal transmitted through the optical fiber 1 into eight fixed wavelength reception units. Fixed wavelength reception units I to VIII (3–10) constitute fixed wavelength reception means utilizing photodiodes and having an internal structure to be explained later. Each of said reception units I to VIII only receives a packet transmitted by the optical signal of a wavelength corresponding to one of the wavelengths $\lambda 1$ to $\lambda 8$. A change-over switch 11 (hereinafter simply called switch or SW), constituting connection alteration means, has input terminals I–VIII respectively connected to the fixed wavelength reception units I3 to VIII 10, and output terminals I–VIII respectively connected to separation-insertion units I(12) to VIII(19). The input terminal I corresponds to the channel of $\lambda 1$ and to the output terminal I, and the input terminal II corresponds to the channel of $\lambda 2$ and to the output terminal II. Also other input terminals correspond to other channels and output terminals. The configuration of the change-over switch 11 is similar to that shown in FIG. 2, but the decoder 129 only decodes a channel address, constituting the channel identification information in the packet employed in the first embodiment, as explained later. Consequently, in the present first embodiment, the decoder unit only requires 8 memory-comparator sets, equal to the number of channels of the multi-channel transmission path, and memories I to VIII respectively store the values of Table 2, indicating the correspondences between the wavelengths used in the fixed wavelength transmission units (wavelengths used in channel process groups to be explained later) and the channel addresses. In the present configuration, as in the conventional one, output designation data are read, corresponding to the channel address of the input packet, from the output designation table 141. Based on said output designation data, the control unit closes a switch 132 positioned at the crossing point of an output line connected to a separation-insertion unit belonging to a channel process group corresponding to the channel address and an input line receiving the input packet, thereby delivering the input packet from the input terminal to a predetermined separation-insertion unit. In this manner the change-over switch 11 alters the channel process means selected for processing the transmitted packet and shifts the packet to a desired channel process group. Separation-insertion units I to VIII (12–19), constituting separation-insertion means, separate, from a packet flow released from the change-over switch, a packet to be transmitted to a terminal through a sub transmission path to be explained later and sends said packet to said sub transmission path, and inserts a packet, transmitted from a terminal through the sub transmission path, into the packet flow released from the change-over switch. The internal structure of said separation-insertion unit will be explained later. Each of the separation-insertion units I(12) to VIII(19) is connected to a terminal. Fixed wavelength transmission units I to VIII (20–27), constituting fixed wavelength transmission means utilizing semiconductor lasers, converts a packet, released from the separation-insertion units, into an optical signal of a predetermined wavelength and transmits said signal, through a multiplexer 28, to an optical fiber 29 constituting the physical medium of the optical wavelength multiplex transmission path. Said semiconductor laser is of DFB (distributed feedback) type, with a multiple electrode structure. Transmission wavelengths $\lambda 1$–$\lambda 8$ are respectively assigned to the fixed wavelength transmission units I(20) –VIII(27) by the control of current injections to the electrodes of said DFB lasers. A wavelength multiplexer 28 synthesizes the optical signals of wavelengths $\lambda 1$–$\lambda 8$ from the eight fixed wavelength transmission units, for transmission to the optical fiber 29, which constitutes the physical medium of the optical wavelength multiplex transmission path and serves as the transmission medium in the multi-channel transmission path between the multiplexer of this node device and the divider of an adjacent downstream node device. Sub transmission paths I to VIII (30–37) serve as packet transmission paths between the separation-insertion units and the terminals. Terminals I to VIII (38–45), respectively connected to the sub transmission paths I–VIII, receive a packet released from the separation-insertion units and generate a packet to other terminals and sends said packet to the separation-insertion units through the sub transmission paths.

The fixed wavelength reception unit I(3), the separation-insertion unit I(12) and the fixed wavelength transmission unit I(20) correspond to a same channel and constitute channel process means for a packet transmitted by the channel of the wavelength $\lambda 1$. Similarly the fixed wavelength reception unit II(4), the separation-insertion unit II(13) and the fixed wavelength transmission unit II(21) constitute channel process means of a packet transmitted by the channel of the wavelength $\lambda 2$, and other fixed wavelength reception units, separation-insertion units and fixed wavelength transmission units are also constructed similarly.

In FIG. 6 there are provided node devices 46–49 each of which is constructed as shown in FIG. 5 and is connected to eight terminals through eight sub transmission paths. Optical fibers 50–53, constituting physical media of the optical wavelength multiplex transmission path, correspond to the optical fibers 1, 29 in FIG. 5 in the following manner. In the node device I(46), the optical fibers 1 and 29 in FIG. 5 respectively correspond to those 53, 50 in FIG. 6. Also in the node device II(47), the optical fibers 1, 29 in FIG. 29 respectively correspond to those 50, 51 in FIG. 6. Similar relations stand also for the node devices III(48) and IV(49).

In the four node devices I(46) to IV(49), the four fixed wavelength reception units I(3), the four separation-insertion units I(12) and the four fixed wavelength transmission unit I(20) correspond to a same channel and constitute a channel process group I for a packet transmitted by the channel of the wavelength $\lambda 1$. Similarly, in said four node devices I(46) to IV(49), the four fixed wavelength reception units II(4), the four separation-insertion units II(13) and the four fixed wavelength transmission units II(21) constitute a channel process group II for a packet transmitted by the channel of the wavelength $\lambda 2$, and other fixed wavelength reception units, separation-insertion units and fixed wavelength transmission units similarly constitute channel process groups III–VIII.

The change-over switch 11 serves to alter the channel process means to be used for processing the transmitted packet, and to shift the packet to a desired channel process group.

FIG. 7 shows the configuration of the packet employed in the present first embodiment, wherein 54 indicates a field describing channel identification information of the packet, or, more specifically, a channel address which is used by the destination terminal of the packet for identifying the channel process group connected through the sub transmission path; 55 indicates a field describing node device identification information of the packet, or, more specifically, a node address which is used by the destination terminal of the packet for identifying the connected node device; and 56 indicates a data section to be transmitted by this packet. Tables 1 and 2 respectively show the node addresses of the node devices and the channel addresses for identifying the channel process groups, in the present embodiment.

TABLE 1

| NODE DEVICE | NODE ADDRESS |
| --- | --- |
| Node device I | 1 |
| Node device II | 2 |

TABLE 1-continued

| NODE DEVICE | NODE ADDRESS |
| --- | --- |
| Node device III | 3 |
| Node device IV | 4 |

TABLE 2

| WAVELENGTH OF CHANNEL PROCESS GROUP | CHANNEL ADDRESS |
| --- | --- |
| $\lambda 1$ | 1 |
| $\lambda 2$ | 2 |
| $\lambda 3$ | 3 |
| $\lambda 4$ | 4 |
| $\lambda 5$ | 5 |
| $\lambda 6$ | 6 |
| $\lambda 7$ | 7 |
| $\lambda 8$ | 8 |

FIG. 8 shows the internal structure of each of the fixed wavelength reception units I(3)–VIII(10) employed in the node device of the first embodiment of the present invention, wherein a filter 57 transmits only the optical signal of a predetermined wavelength assigned to each fixed wavelength reception unit, and intercepts the optical signals of other wavelengths. The transmission wavelengths of the filters of the fixed wavelength reception units I to VIII are respectively set at $\lambda 1$ to $\lambda 8$, wherein said wavelengths are numbered in the increasing order of the wavelength, namely $\lambda 1<\lambda 2<\lambda 3<\lambda 4<\lambda 5<\lambda 6<\lambda 7<\lambda 8$. A reception unit 58 utilizing a photodiode converts the optical signal of a predetermined wavelength transmitted by the filter into an electrical signal, for supply to the input terminal of the change-over switch. Said reception unit is equipped with a PIN photodiode (PIN-PD) and is capable of releasing the output signal after wave forming by an amplifier, an equalizer and an identification circuit connected after the photodiode.

Figure 9:
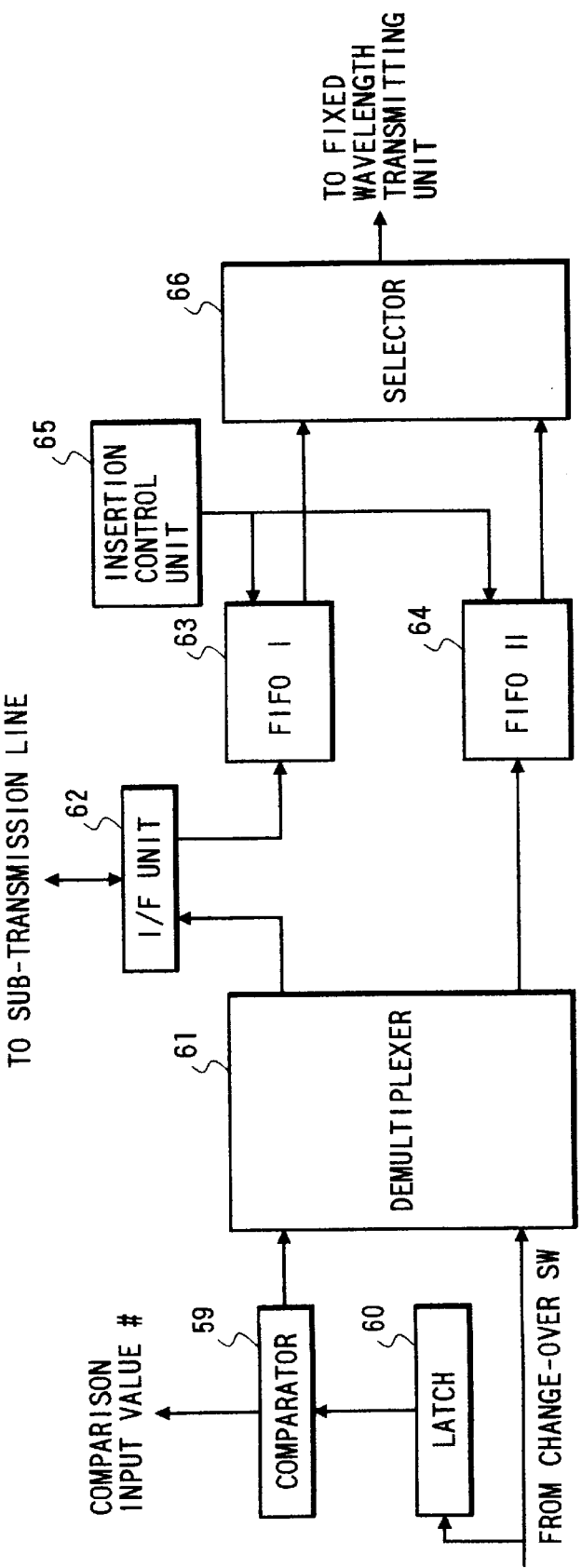
FIG. 9 is a view showing the configuration of a separation/insertion unit in the first embodiment of the present invention.

FIG. 9 shows the internal structure of each of the separation-insertion units I(12)–VIII(19) employed in the node device of the first embodiment of the present invention. Said separation-insertion units I–VIII have an identical internal structure. In FIG. 9, a comparator 59 compares the node address section, or the node device identification information, in the packet released from a latch 60 with a reference input value #, and releases, in case of coincidence, a separation instruction signal to a demultiplexer 61, or, in case of non-coincidence, a relay instruction signal. The reference input value # is a value in Table 1, corresponding to the node address of each node device. A latch 60 latches the node address section of the packet and sends it to the comparator 59. A demultiplexer 61 sends the input packet to an I/F unit 62 or a FIFO II(64) according to the instruction for separation or relay by the comparator 59. An I/F unit 62 sends the packet, released from the demultiplexer, to a sub transmission path, and sends the packet, entered therefrom, to a FIFO I(63). FIFO (first-in-first-out) registers 63, 64 temporarily store the entered packet and release the stored packet, in the order of input, to a selector 66, under the control by an insertion control unit 65. The insertion control unit 65 effects read-out control of the FIFO I(63) and the FIFO II(64) and instructs the selector of a FIFO to be selected, thereby inserting the packet, transmitted from the sub transmission path, into the packet flow released from the change-over switch. Under the instruction from the read-out control unit, a selector 66 selects a FIFO storing the packet signal to be released and causes said packet signal to be transmitted to the fixed wavelength transmission unit.

In the following there will be explained the function of the first embodiment of the present invention, with reference to the attached drawings, taking an example of packet transmission from a terminal I(38) connected to a sub transmission path I(30) of a node device I(46) to a destination terminal V(42) connected to a sub transmission path V(34) of a node device III(48). In the following description, said packet is called packet A. Also in the following description, for the convenience of explanation, corresponding components of different node devices will be indicated by the same numbers as indicated in the drawings.

The transmitting terminal I(38), connected to the sub transmission path I(30) of the node device I(46), constructs the packet A of the configuration shown in FIG. 7, by adding a channel address and a node address to the data to be transmitted to the terminal V(42) connected to the sub transmission path V(34) of the node device III(48), and transmits said packet A to the separation-insertion unit I(12) of the node device I(46) through the sub transmission path I(30). As the destination terminal V(42) is connected through the sub transmission path to the separation-insertion unit V(16) belonging to the channel process group with a wavelength $\lambda 5$, the channel address is set as "5" according to Table 2. Also as the destination of the packet A is the node device III(48), the node address is set as "3" according to Table 1.

The I/F unit of the separation-insertion unit I(12) of the node device I(46) stores, in succession, the packet A transmitted through the sub transmission path I(30) into the FIFO I(63). After the completion of said storage, the insertion control unit 64 detects an inteval in the packet flow from the FIFO II(64) and switches the input of the selector to the FIFO I(63), thereby terminating the readout from the FIFO II(64) and initiating the readout from the FIFO I(63). After the reading of the packet A stored in the FIFO I(63), the insertion control unit switches the selector input again to the FIFO II(64), thereby terminating the readout from the FIFO I(63) and initiating the readout from the FIFO II(64). The packet A released from the selector is supplied to the fixed wavelength transmission unit I(20) and is converted, by the DFB semiconductor laser therein, to an optical signal of the wavelength $\lambda 1$, which is transmitted to the optical fiber 29 through the multiplexer 28. The fixed wavelength transmission units I(20)–VIII(27) transmit the packets released from the separation-insertion units I(12)–VIII(19) to the multiplexer 28 after conversion into predetermined wavelengths. The transmitted optical signals have wavelengths $\lambda 1$–$\lambda 8$ respectively assigned, as explained in the foregoing, to the fixed wavelength transmission units I(20)–VIII(27). The optical signals, emitted from the eight fixed wavelength transmission units and having mutually different wavelengths, are mixed without mutual interference in the multiplexer 28, whereby the lights of all the wavelengths are introduced into the optical fiber and transmitted to the adjacent downstream node device II(47). In this operation, the packet A transmitted from the terminal I(38) connected to the sub transmission path I(30) of the node device I(46) to the terminal V(42) connected to the sub transmission path V(34) of the node device III(48) is transmitted, as an optical signal of the wavelength $\lambda 1$ from the fixed wavelength transmission unit I(20), to the node device II(47).

Said packet A transmitted to the node device II(47) is subjected therein to a change of the channel process group and is transmitted to the downstream node device by a channel of the wavelength $\lambda 5$. The optical signals of the wavelengths $\lambda 1$–$\lambda 8$, transmitted from the node device I(46) through the optical fiber 50, are divided by the divider of the node device II(47) and respectively enter the fixed wavelength reception units I(3)–VIII(10). In the fixed wavelength reception unit I(3) the optical signal of the wavelength $\lambda 1$ alone is transmitted by the filter and received by the photodiode. As the packet A is transmitted from the node device I(46) as an optical signal of $\lambda 1$, it is received by said fixed wavelength reception unit I(3) and is supplied to the change-over switch 11.

In the decoder 129 of the change-over switch 11, the channel address section of the input packet A is latched by the latch 137 and is supplied to the comparators I–VIII. As the channel address of the packet has a value "5" as explained before while the memories I–VIII respectively store "1" to "8" as shown in Table 2, the comparator V generates the coincidence signal to generate a predetermined address from the table address generator, whereby the output designation data corresponding to the channel process group V are read from the output designation table. After the reading of the channel address in the decoder 129, the packet A is temporarily stored in the FIFO I(30) and released to the input line I(131-1) after the output control of the output lines by the control unit. In this operation, based on the output designation data from the decoder, the control unit closes a switch at the crossing point of the input line I(131-1) and the output line V(134-5), whereby the packet A is released to said output line V(134-5) and to the separation-insertion unit V(16) connected thereto.

Out of the packet A entered into the separation-insertion unit V(16), the node address is latched by the latch 60 and is supplied to the comparator. As the node address of the packet A is set at "3" while the reference input value # of the node device II(47) is set at "2", they do not coincide each other, so that the comparator 59 sends a relay instruction signal to the demultiplexer 61, which, in response to said signal, sends the entered packet A to the FIFO II(64). The packet A, stored in the FIFO II(64), is read therefrom under the control of the insertion control unit, then supplied to the fixed wavelength transmission unit V(24) through the selector 66, and emitted as the optical signal of $\lambda 5$ to the optical fiber 29 through the multiplexer 28. Thus, the packet A, received by the fixed wavelength reception unit I(3) of the node device II(47) as the optical signal of a wavelength $\lambda 1$, is switched by the change-over switch 11 from the channel process group I to V and transmitted as an optical signal of $\lambda 5$ from the fixed wavelength transmission unit V(24).

The packet A, transmitted as the optical signal of $\lambda 5$ from the node device II(47) through the optical fiber 51, is divided by the divider of the node device III(48) and is received by the fixed wavelength reception unit V(7), and is supplied to the change-over switch 11. Said switch 11 reads the channel address by the decoder 129, in the same manner as in the node device II(47), then predetermined output designation data are supplied to the control unit and the packet A is released from the output terminal V and supplied to the separation-insertion unit V(16). The latch 60 of said separation-insertion unit V(16) latches the node address of the packet A and sends it to the comparator 59. As the reference input value # of said comparator 59 is set at "3", which coincides with the node address of the packet A, the comparator 59 sends a separation instruction signal to the demultiplexer 61, which in response transmits the entered packet A to the I/F unit 62. Then the packet A is transmitted through the sub transmission path V(34), then received by the destination terminal V(42) and subjected to the elimination of the address section, whereupon the data section alone is taken out and processed in desired manner.

As explained in the foregoing, the packet A addressed from the terminal I(38) connected to the sub transmission path I(30) of the node device I(46) to the terminal V(42) connected to the sub transmission path V(34) of the node device III(48) is transmitted with a wavelength λ1 from the fixed wavelength transmission unit I(20) of the node device I(46), then shifted in the node device II(47) to the channel of the channel process group containing the separation-insertion unit V(16) to which the destination sub transmission path of the node device III(48) is connected, namely the channel process group corresponding to the wavelength λ5, then received by the fixed wavelength reception unit V(7) of the node device III(48), separated by the separation-insertion unit V(16), further transmitted by the sub transmission path V(34) and received by the terminal V(42).

In the present embodiment, the use of the change-over switch allows shifting to any channel process means, and the packet can securely reach the destination terminal within one round of the network, as the change-over switch is provided in each node device. Also the number of the input and output terminals of the change-over switch can be limited to that of the channels, and said change-over switch is only required to decode the channel address. Consequently the configuration of the change-over switch can be made extremely simple.

Embodiment 2

Figure 4:
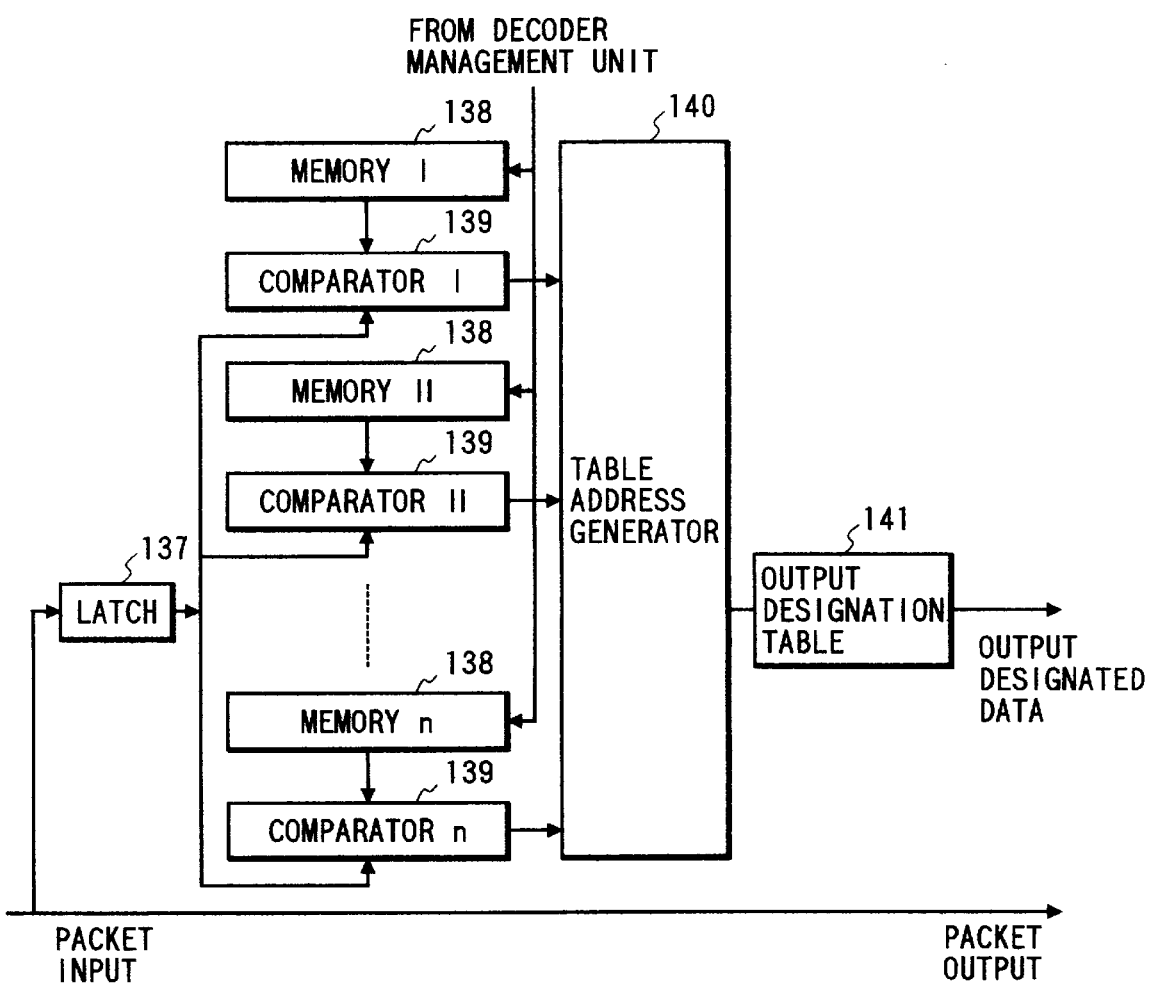
FIG. 4 is a view showing the configuration of a conventional decoder.
Figure 10:
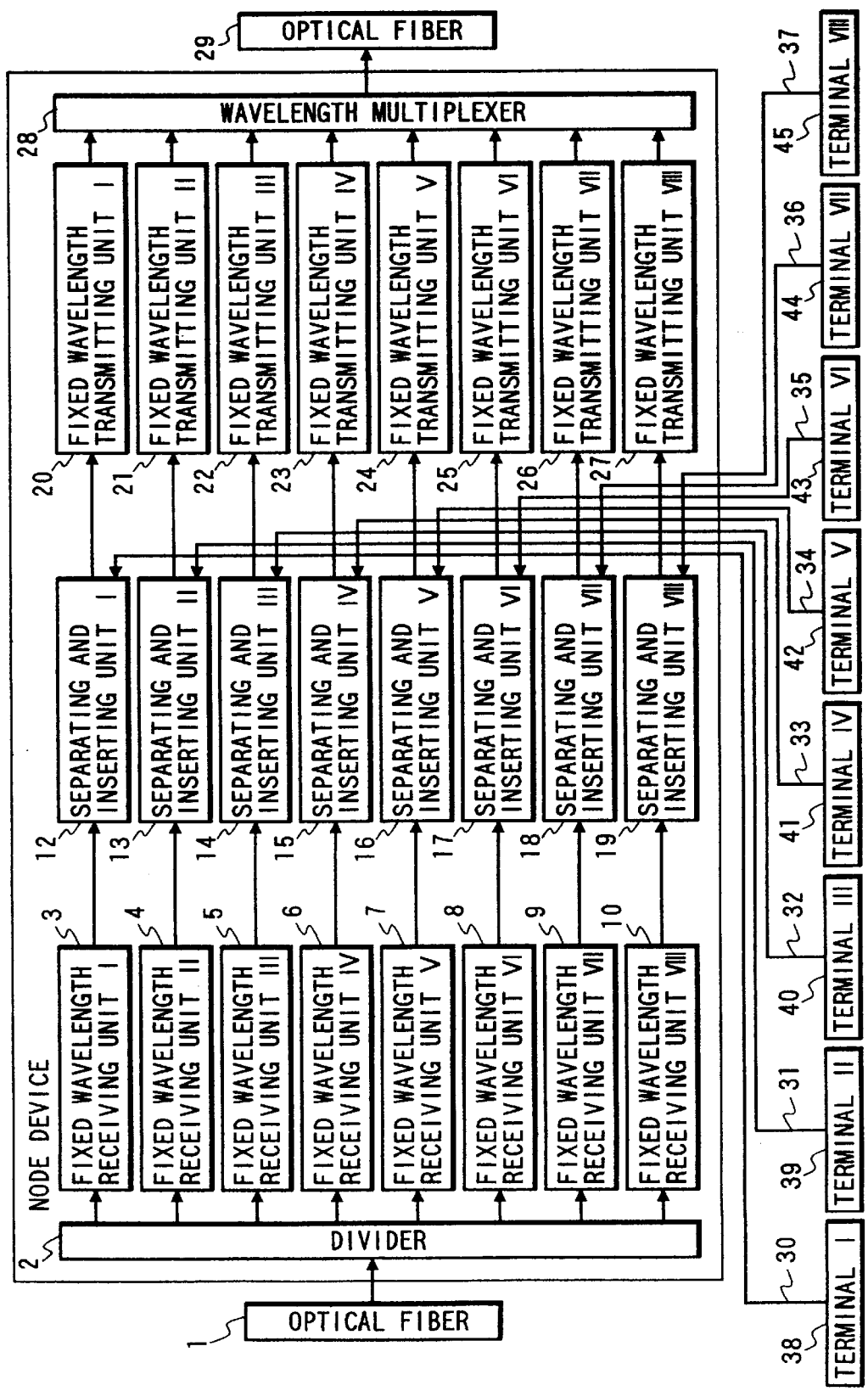
FIG. 10 is a view showing the configuration of a node device constituting a second embodiment of the present invention.
Figure 11:
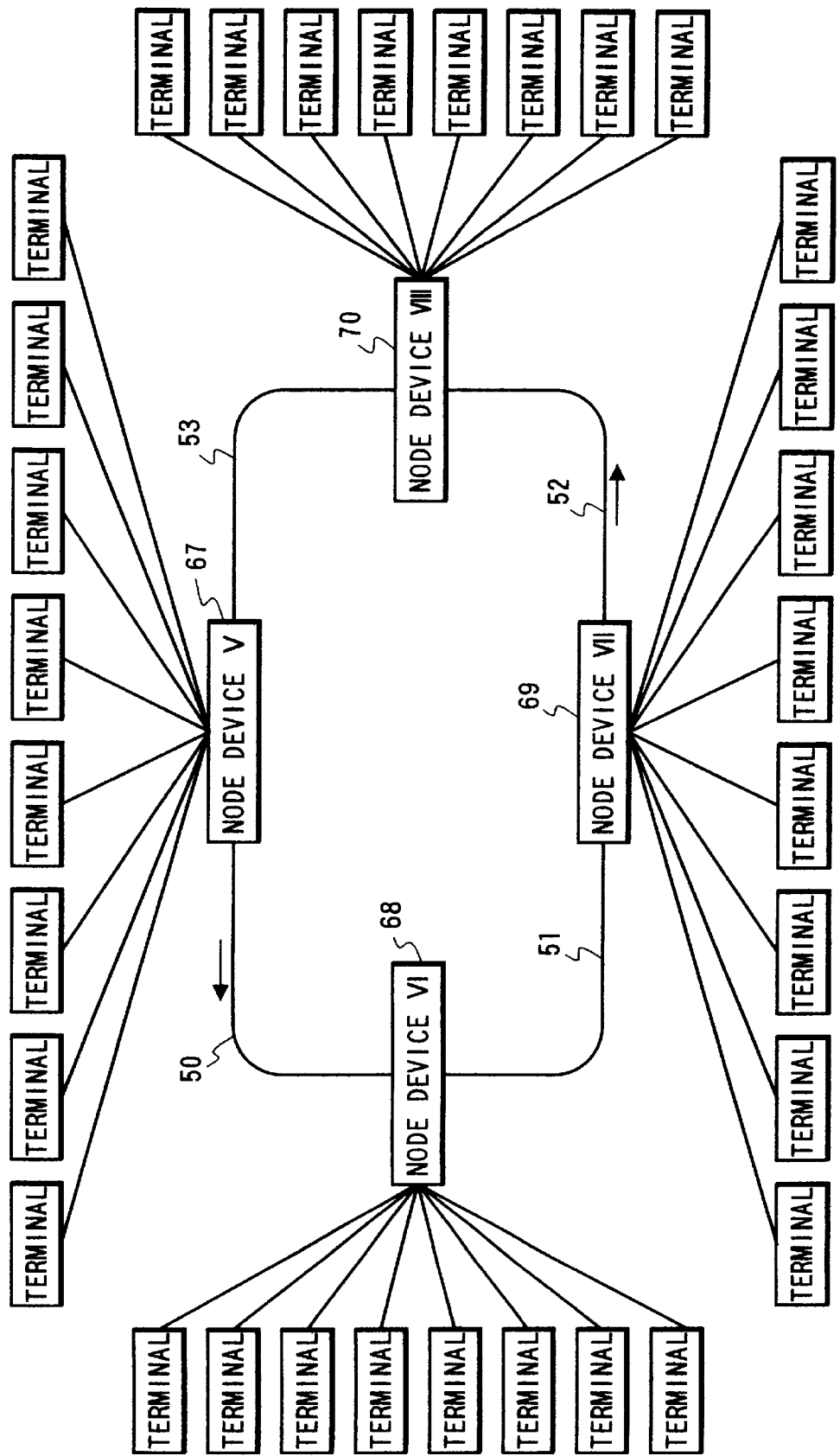
FIG. 11 is a view showing the configuration of a network system in the second embodiment of the present invention.
Figure 12:
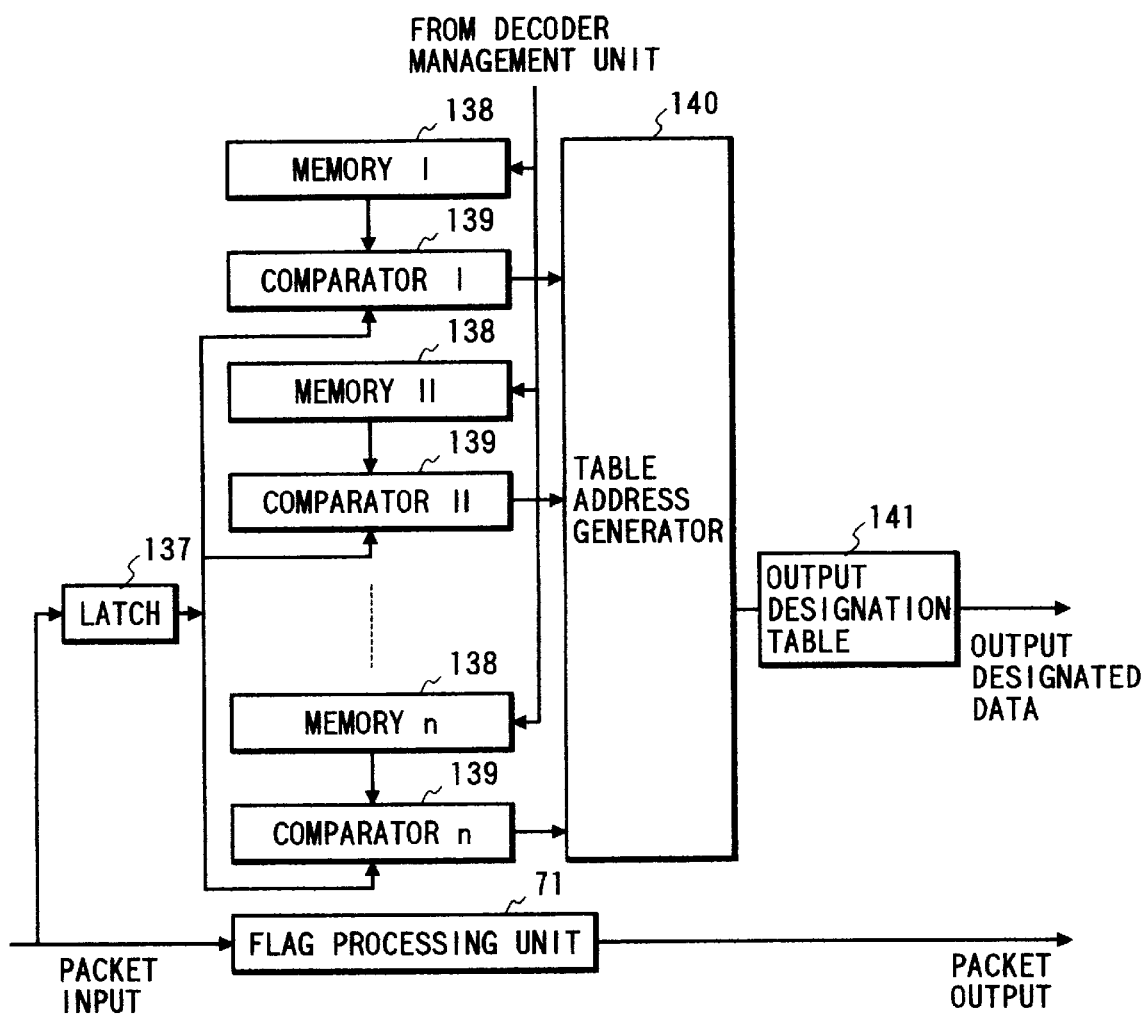
FIG. 12 is a view showing the configuration of a decoder unit in the node device in the second embodiment of the present invention.

FIG. 10 shows the internal structure of a node device employed in a second embodiment of the present invention. This node device lacks the connection alteration means, and is same in function as that in FIG. 5, except that the change-over switch 11 is eliminated and that the latch and the comparator in the separation-insertion unit are adapted to process also an address flag, to be explained later, of the packet. FIG. 11 shows an example of the configuration of the network system employing the above-explained node device, wherein node devices VI(68), VII(69) and VIII(70) are respectively composed of the node device of the second embodiment of the present invention, whereas a node device V(67) is equipped with a change-over switch constituting the input/output connection alteration means. In the node device provided with the change-over switch in said second embodiment, the decoder unit is similar in function to that shown in FIG. 4, except that there is additionally provided a flag process unit 71 for processing the address flag of the packet, as shown in FIG. 12. Said flag process unit 71 sets an address flag in the packet as will be explained later, thereby indicating that the node address has become effective. The configuration of the network system shown in FIG. 11 is similar to that shown in FIG. 6, except for the difference in the node devices.

Figure 13:
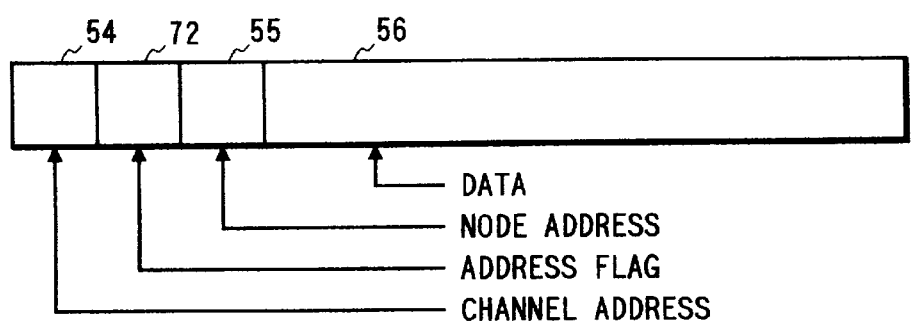
FIG. 13 is a view showing the configuration of a packet in the second embodiment of the present invention.

FIG. 13 shows the configuration of the packet employed in the second embodiment of the present invention, said configuration being same as that shown in FIG. 7, except for the addition of an address flag 72 which is the effectiveness information indicating the effectiveness of the node device identification information. The address flag 72 is reset at the transmission of the packet from the transmitting terminal, and is set at the alteration of the channel process group in the node device equipped with the connection alteration means. It is thus rendered possible to prevent erroneous separation of the packet by the separation-insertion means prior to the change to the desired channel process group. For example, in case of packet transmission from the terminal I(38) of the node device VI(68) to the terminal II(39) of the node device VII(69), the packet transmitted from the terminal I(38) of the node device VI(69) is supplied to the separation-insertion unit I(12) in the node device VII(69) without the change of the channel process group, as said node device VII(69) lacks the changeover switch. As the node address is set at a value corresponding to the node device VII(69), the separation-insertion unit effects separating operation whereby the packet is erroneously transmitted to the terminal I(38). For avoiding such erroneous operation, the address flag is reset at the initial transmission and is set at the alteration to the predetermined channel process group, whereby it is indicated that the node address has become effective.

In FIGS. 10 to 13, components same as those in the foregoing first embodiment are represented by same numbers.

In the following there will be explained the function of the second embodiment of the present invention, with reference to the attached drawings, taking an example of packet transmission from the terminal I(38) connected to the sub transmission path I(30) of the node device VI(68) to the destination terminal V(42) connected to the sub transmission path V(34) of the node device VII(69) and giving emphasis on the difference from the foregoing first embodiment. In the following description said packet is called packet B. Also in the following description, for the convenience of explanation, corresponding components of different node devices will be represented by the numbers same as those in the foregoing drawings. The channel addresses of the node devices are set as shown in Table 3.

TABLE 3

| NODE DEVICE | NODE ADDRESS |
|---|---|
| Node device V | 1 |
| Node device VI | 2 |
| Node device VII | 3 |
| Node device VIII | 4 |

The transmitting terminal I(38) connected to the sub transmission path I(30) of the node device VI(68) generates the packet B of the configuration shown in FIG. 13, by adding, to the data to be addressed to the terminal V(42) connected to the sub transmission path V(34) of the node device VII(69), a channel address and a node address and resetting the address flag, and transmits said packet B through the sub transmission path I(30) to the separation-insertion unit I(12) of the node device VI(68). In this operation, the channel address and the node address are respectively set at "5" and "3", by referring to Tables 2 and 3, as in the foregoing first embodiment. The packet B transmitted to the I/F unit of the separation-insertion unit I(12) of the node device VI(68) is inserted, as in the foregoing first embodiment, into the packet flow read from the FIFO II(64), then converted by the DFB semiconductor laser of the fixed wavelength transmission unit into an optical signal of a wavelength λ1, emitted to the optical fiber 29 and transmitted to the node device VII(69).

Though the node device VII(69) has the terminal V(42) which is designated as the destination of the packet B, it lacks the connection alteration means, and the packet B is currently transmitted in the channel process group I while the destination terminal V(42) is connected to the separation-insertion unit V(16) belonging to the channel process group V, so that the packet B is relayed from this node device VII(69) to the node device VIII(70). The packet B received by the fixed wavelength reception unit I(3) of the node device VII(69) is supplied to the separation-insertion unit I(12) whereupon the address flag and the node address are latched in the latch 60. The comparator 59 compares the address flag with a value indicating the set state, and also compares the node address with a reference input value # which is the node address "3" of the node device VII(69). As a result, the node address shows coincidence, but the address flag is not set, so that the comparator 59 sends a relay instruction signal to the demultiplexer 61, which in response stores the packet B in the FIFO II(64). The packet B thus stored in the FIFO II(64) is read therefrom under the control of the insertion control unit 65 and is transmitted from the fixed wavelength transmission unit I(20), as an optical signal of λ1, to the node device VIII(70).

The node device VIII(70) effects a relay process as in the node device VII(69), whereby the packet B is transmitted to the node device V(67).

In the node device V(67), the packet B is shifted from the channel process group I to V including the separation-insertion unit V(16) to which the destination terminal V(42) is connected, and the address flag is set.

The packet B, transmitted from the node device VIII(70) to V(67) is received by the fixed wavelength reception unit I(3) and supplied to the change-over switch 11. In the decoder shown in FIG. 8, the channel address is read as in the first embodiment and, because it coincides with the value in the memory V, the comparator V generates the coincidence signal, whereby the output designation data corresponding to the channel process group V are read from the output designation table. After the above-explained channel address reading and the setting of the address flag in the flag process unit 71, the packet B is temporarily stored in the FIFO I(30), then released to the output line V(134-5) by the closing of the predetermined switch by the output designation data, and supplied to the separation-insertion unit V(16) connected to said output line.

Out of the packet B supplied to the separation-insertion unit V(16), the address flag and the node address are latched by the latch 60 and are respectively compared, in the comparator, with predetermined values. Though the address flag is set but the node address is different in this state, the comparator 59 sends a relay instruction signal to the demultiplexer 61, whereby the packet B is temporarily stored in the FIFO II(64) and is then transmitted from the fixed wavelength transmission unit V(24) as an optical signal of λ5 to the node device VI(68). Also the node device VI(68) effects a relay process, and the packet B is again transmitted, as an optical signal of λ5, to the node device VII(69) to which the destination terminal V(42) is connected.

In said node device VII(69), the packet B is received by the fixed wavelength reception unit V(7) and entered into the separation-insertion unit V(16), in which the latch 60 latches the address flag and the node address of the packet B and sends them to the comparator 59. Since the address flag is set and the node address coincides with the reference input value # which is the node address "3" of the node device VII(69), the comparator 59 sends a separation instruction signal to the demultiplexer 61, which in response sends the entered packet B to the I/F unit 62. The packet B is then transmitted through the sub transmission path V(34), received by the destination terminal V(42), subjected to the elimination of the address section from the packet, and the data section alone is taken out and processed in a desired manner.

As explained in the foregoing, the packet B addressed from the terminal I(38) connected to the sub transmission path I(30) of the node device VI(68) to the destination terminal V(42) connected to the sub transmission path V(34) of the node device VII(69) is transmitted with a wavelength λ1 from the fixed wavelength transmission unit I of the node device VI(68), then transmitted by the node device VII(69), further relayed by the node device VII(70), then shifted in the node device V(67) to the channel process group corresponding to the wavelength λ5 and including the separation-insertion unit V to which the destination terminal of the node device VII(69) is connected, further subjected to the setting of the address flag, then relayed by the node device VI(68), received by the fixed wavelength reception unit V(7) of the node device VII(69), separated by the separation-insertion unit V(16), transmitted by the sub transmission path V(34) and finally received by the terminal V(42).

The present embodiment can adopt less expensive node devices without the input/output connection alteration means, thereby realizing a network in less expensive manner, without decreasing the number of connected terminals.

Embodiment 3

Figure 14:
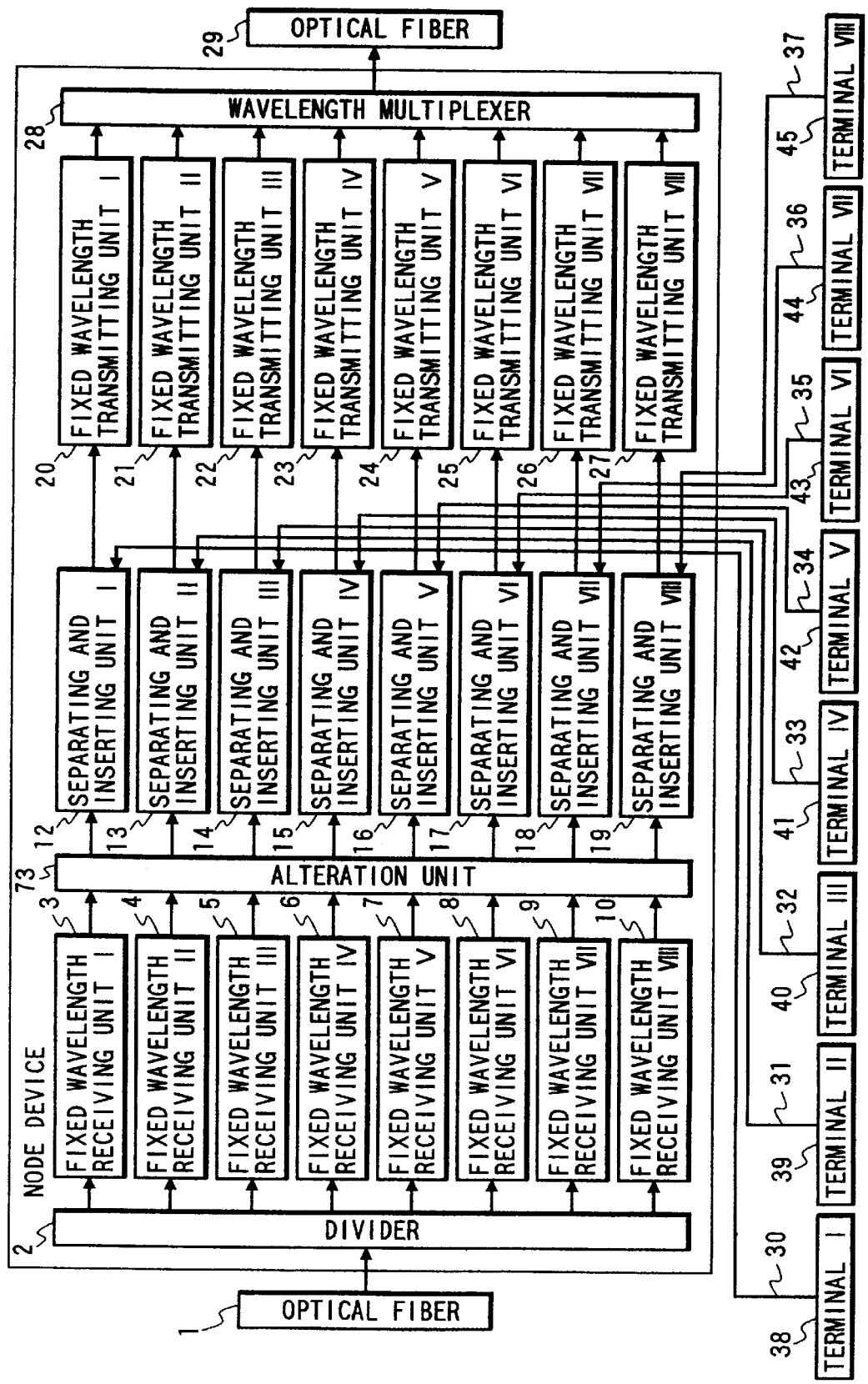
FIG. 14 is a view showing the configuration of a node device constituting a third embodiment of the present invention.

FIG. 14 shows the configuration of a node device employed in a third embodiment of the present invention. Said node device is provided with an alteration unit 73 instead of the change-over switch 11 in FIG. 5, and the latch and the comparator in the separation-insertion unit are capable also of processing the address flag of the packet, as in the foregoing second embodiment. Other components are similar to those in the node device shown in FIG. 5.

Figure 15:
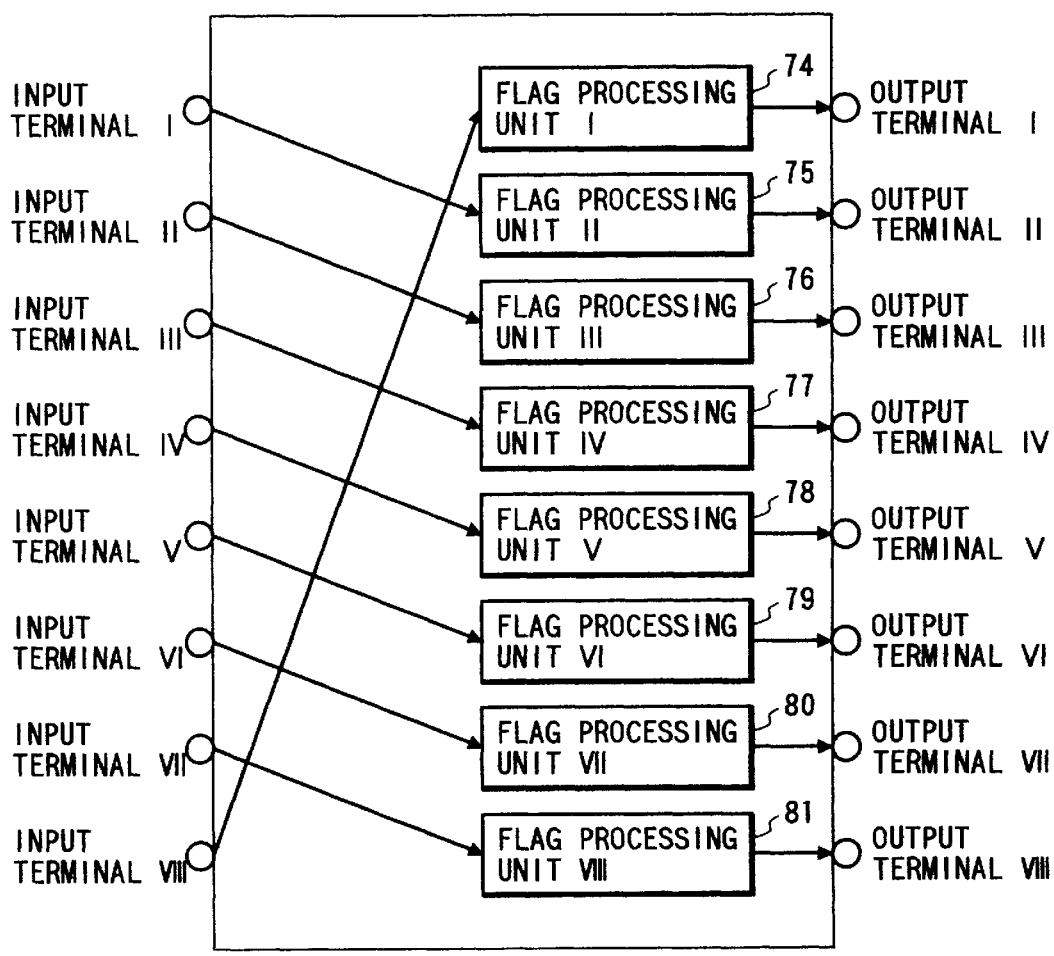
FIG. 15 is a view showing a modified part of the node device of the third embodiment of the present invention.

FIG. 15 shows the internal structure of the alteration unit 73, wherein provided are flag process units I to VIII (74–80), each of which is adapted to set the address flag in case the channel address of the input packet coincides with the number of the channel process group of the separation-insertion unit connected through the output terminal. The packet flow entered from the input terminals I to VIII are respectively shifted by one and given to the flag process units II to I. More specifically the packet is sent from the input terminal I to the output terminal II, similarly from II to III, from III to IV, from IV to V, from V to VI, from VI to VII, from VII to VIII and from VIII to I. Said input terminals I to VIII are respectively connected to the fixed wavelength reception units I(3) to VIII(10), while the output terminals I to VIII are respectively connected to the separation-insertion units I(12) to VIII(l9). The alteration unit 73 with such connections effects alteration of the channel process means in a fixed pattern, thereby achieving changeover of the channel process groups. Said pattern is not limited to the stepwise shift of the input and output terminals in the present embodiment, but can assume any form as long as the packet from the input terminal is supplied to an output terminal not corresponding to said input terminal.

Figure 16:
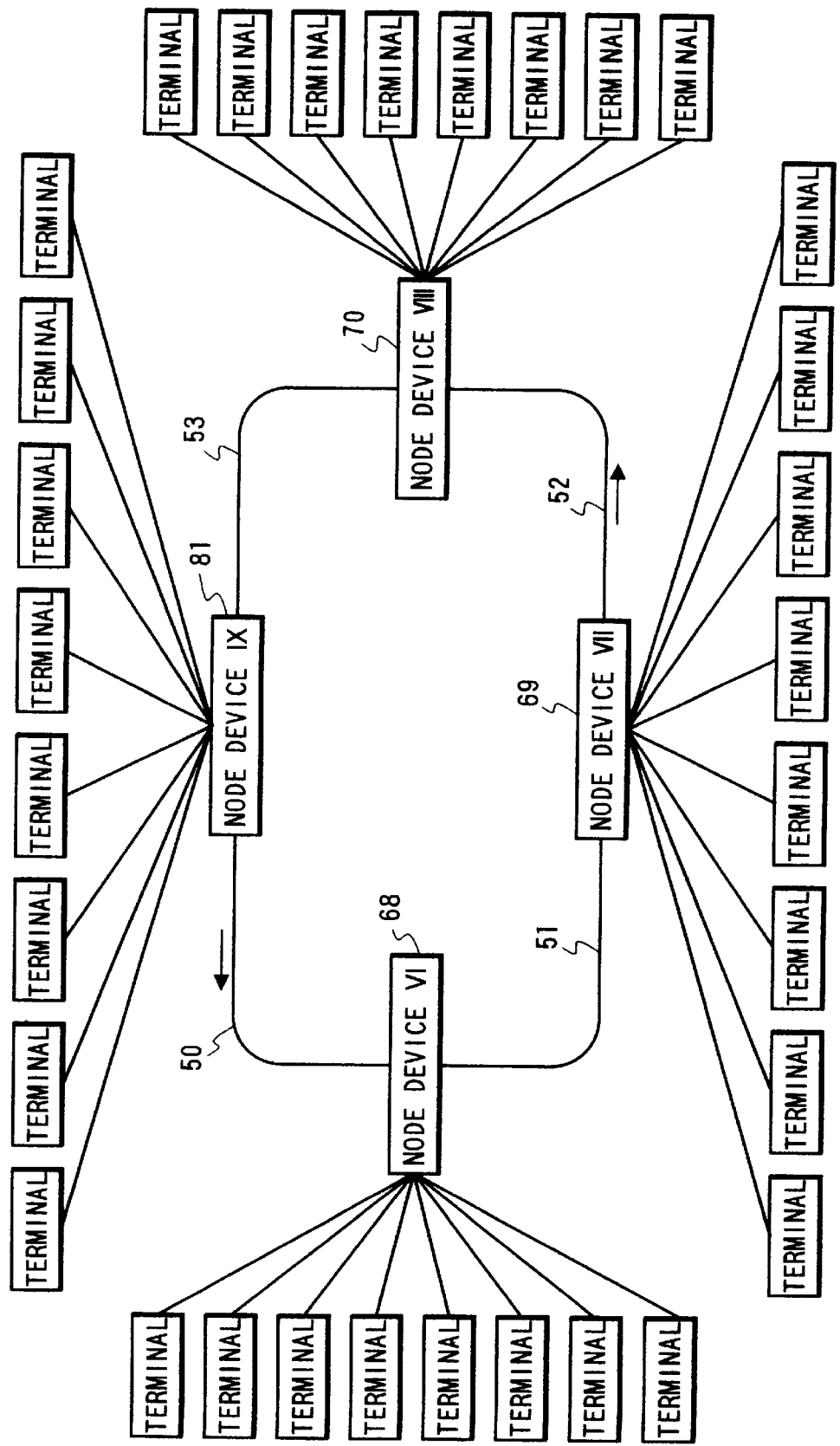
FIG. 16 is a view showing the configuration of a network system in the third embodiment of the present invention.

FIG. 16 shows an example of the configuration of the network system employing the present node device, wherein a node device IX(81) is composed of the node device of the present embodiment shown in FIG. 15, while node devices VI(68), VII(69), VIII(70) are composed of the node device shown in FIG. 10. The packet employed in the third embodiment of the present invention is same, in configuration, as that shown in FIG. 13. In FIGS. 14 to 16, components same as those in the first embodiment are represented by same numbers.

In the following there will be explained the function of the third embodiment of the present invention, with reference to the attached drawings, taking an example of packet transmission from a terminal I(38) connected to the sub transmission path I(30) of the node device VI(68) to a destination terminal II(39) connected to the sub transmission path II(31) of the node device VII(69) and giving emphasis on the difference from the foregoing first and second embodiments. In the following description, said packet will be called packet C, and same components in different node devices will be represented, for the convenience of explanation, by a same number given in the drawings. The channel addresses of the node devices are set as shown in Table 4.

TABLE 4

| NODE DEVICE | NODE ADDRESS |
| --- | --- |
| Node device IX | 1 |
| Node device VI | 2 |
| Node device VII | 3 |
| Node device VIII | 4 |

The transmitting terminal I(38) connected to the sub transmission path I(30) of the node device VI(68) generates the packet C of the configuration shown in FIG. 13, by adding, to the data to be addressed to the terminal II(39) connected to the sub transmission path II(91) of the node device VII(69), a channel address and a node address and resetting the address flag, and transmits said packet C through the sub transmission path I(30) to the separation-insertion unit I(12) of the node device VI(68). In this operation, the channel address and the node address are respectively set at "2" and "3", by referring to Tables 2 and 4, since the destination is the terminal II(39) connected to the sub transmission path II(31) of the node device VII(69). The packet C transmitted to the I/F unit of the separation-insertion unit I(12) of the node device VI(68) is inserted, as in the foregoing first and second embodiments, into the packet flow read from the FIFO II(64), then converted by the DFB semiconductor laser of the fixed wavelength transmission unit into an optical signal of a wavelength λ1, emitted into the optical fiber 29 through the multiplexer 28 and transmitted to the node device VII(69).

Though the node device VII(69) has the terminal II(39) which is designated as the destination of the packet C, it lacks the connection alteration means, and the packet C is currently transmitted in the channel process group I of the wavelength λ1 while the destination terminal II(39) is connected to the separation-insertion unit II(13) belonging to the channel process group II, so that the packet C is relayed from this node device VII(69) to the node device VIII(70), in the same manner as in the foregoing second embodiment. The packet C received by the fixed wavelength reception unit I(3) of the node device VII(69) is supplied to the separation-insertion unit I(12) whereupon the address flag and the node address are latched in the latch 60. The comparator 59 compares the address flag with a value indicating the set state, and also compares the node address with a reference input value # which is the node address "3". As a result, the node address shows coincidence, but the address flag is not set, so that the comparator 59 sends a relay instruction signal to the demultiplexer 61, which in response stores the packet C in the FIFO II(64). The packet C thus stored in the FIFO II(64) is read therefrom under the control of the insertion control unit 65 and is transmitted from the fixed wavelength transmission unit I(20), as an optical signal of λ1, to the node device VIII(70). The node device VIII(70) effects a relay process as in the node device VII(69), whereby the packet C is transmitted to the node device IX(81).

In the node device IX(81), the packet C is shifted from the channel process group I to II including the separation-insertion unit II(13) to which the destination terminal II(39) is connected, and the address flag is set. The packet C, transmitted from the node device VIII(70) to IX(81) is received by the fixed wavelength reception unit I(3) and supplied to the input terminal I of the alteration unit 73. As the input terminal I of the alteration unit 73 is connected to the flag process unit II(75) as shown in FIG. 15, the packet C is subjected to the setting of the address flag in said flag process unit II(75), and is supplied, from the output terminal II to the separation-insertion unit II(13). In this manner the alteration unit 73 effects alteration of the channel process means, whereby the packet C is shifted from the channel process group I to II.

Out of the packet C supplied to the separation-insertion unit II(13), the address flag and the node address are latched by the latch 60 and are respectively compared, in the comparator, with predetermined values. Though the address flag is set but the node address is different in this state, the comparator 59 sends a relay instruction signal to the demultiplexer 61, whereby the packet C is temporarily stored in the FIFO II(64) and is then transmitted from the fixed wavelength transmission unit II(21) as an optical signal of λ2 to the node device VI(68). Also the node device VI(68) effects a relay process, and the packet C is again transmitted, as an optical signal of λ2, to the node device VII(69) to which the destination terminal II(39) is connected.

In said node device VII(69), the packet C is received by the fixed wavelength reception unit II(4) and entered into the separation-insertion unit II(13), in which the latch 60 latches the address flag and the node address of the packet C and sends them to the comparator 59. Since the address flag is set and the node address coincides with the reference input value # which is the node address "3" of the node device VII(69), the comparator 59 sends a separation instruction signal to the demultiplexer 61, which in response sends the entered packet C to the I/F unit 62. The packet C is then transmitted through the sub transmission path II(31), received by the destination terminal II(39), subjected to the elimination of the address section and the data section alone is taken out and processed in a desired manner as in the foregoing first and second embodiments.

As explained in the foregoing, the packet C addressed from the terminal I(38) connected to the sub transmission path I(30) of the node device VI(68) to the destination terminal II(39) connected to the sub transmission path II(31) of the node device VII(69) is transmitted with a wavelength λ1 from the fixed wavelength transmission unit I of the node device VI(68), then transmitted by the node device VII(69), further relayed by the node device VIII(70), then shifted in the node device IX(81) to the channel process group corresponding to the wavelength λ2 and including the separation-insertion unit II to which the destination sub transmission path of the node device VII(69) is connected, further subjected to the setting of the address flag, then relayed by the node device VI(68), received by the fixed wavelength reception unit II(4) of the node device VII(69), separated by the separation-insertion unit II(13), transmitted by the sub transmission path II(31) and received by the terminal II(39).

In the foregoing description of the third embodiment, the packet C is transmitted from the terminal I(38) connected to the sub transmission path I(30) of the node device VI(68) to the destination terminal II(39) connected to the sub transmission path II(31) of the node device VII(69), and requires only one changeover of the channel process group from I to II, which can be achieved by only one pass through the alteration unit 73 of the node device IX(81). However, the number of required passes through the alteration unit 73 varies depending on the channel process groups to which the transmitting terminal and the destination terminal respectively belong. For example, two passes are required for a change of the channel process group from I to III, and seven passes are required for a change of the channel process group from II to I. The channel flag is set at the last alteration, namely when the packet is released to a channel of which address coincides with the channel address of the packet.

The present embodiment allows further cost reduction, because of the absence of the change-over switch which changes the connection between the input and output terminals, though the transmission distance becomes longer for certain packets.

Embodiment 4

Figure 17:
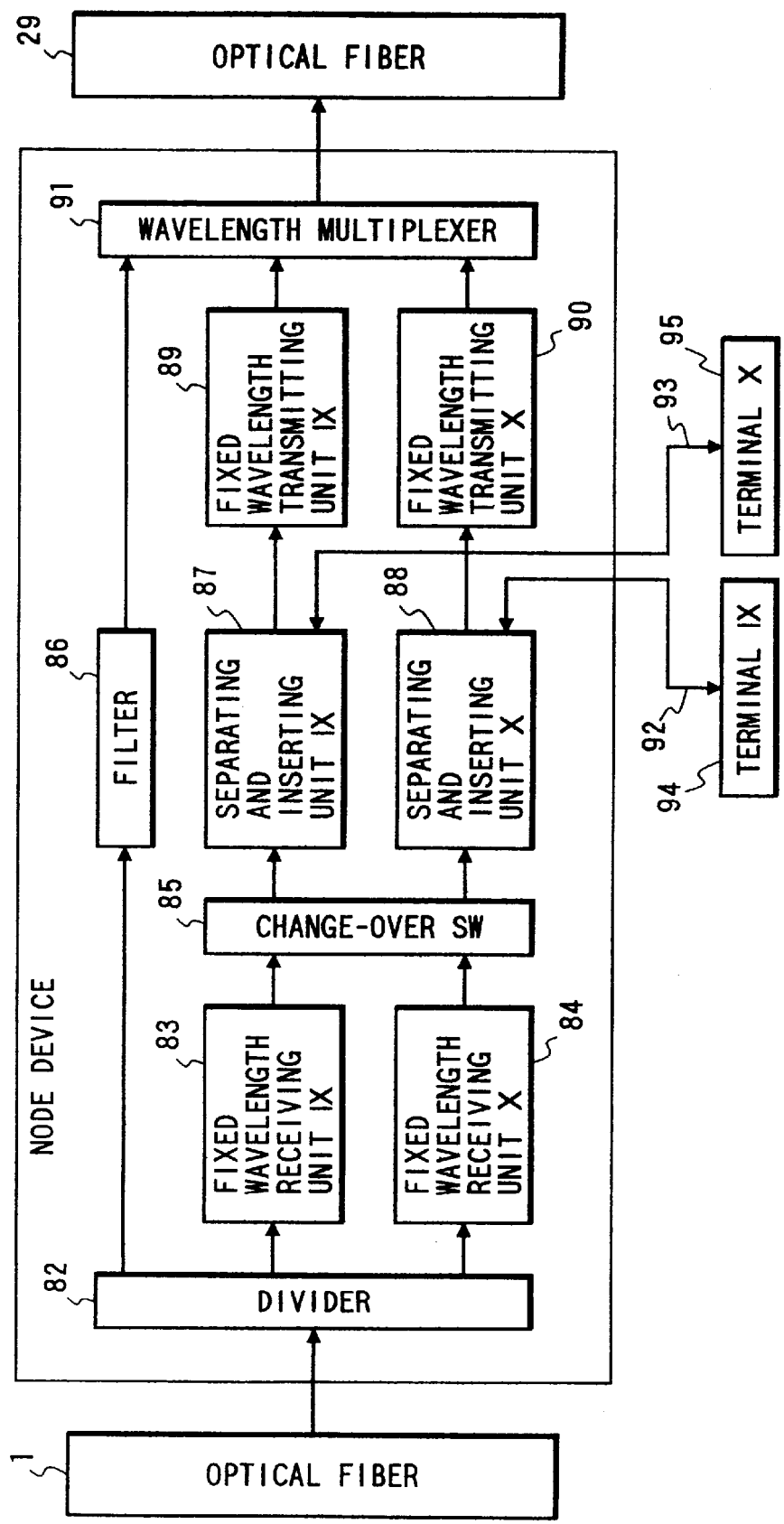
FIG. 17 is a view showing the configuration of a node device constituting a fourth embodiment of the present invention.

FIG. 17 shows the internal structure of a node device employed in a fourth embodiment of the present invention. The present node device has channel process means fewer in number than channels of the multi-channel transmission path, and, in the illustrated example, has two channel process means. The multi-channel transmission path utilizes eight wavelengths as in the foregoing embodiments.

Referring to FIG. 17, a divider 82 divides the optical signal transmitted by an optical fiber into two fixed wavelength reception units and a filter 86. Fixed wavelength reception units IX(83) and X(84), utilizing photodiodes, constitute fixed wavelength reception means as in the foregoing first embodiment. Said fixed wavelength reception means IX(83) and X(84) respectively receive the optical signals of wavelengths λj and λk. Each terminal is assigned with predetermined wavelengths λj and λk. The assigned wavelengths of the terminals will be explained later. A change-over switch 85 constitutes alteration means for altering the channel process means for processing the packet, and is similar, in the internal structure, to the change-over switch in the second embodiment. The decoder of the change-over switch 85 is similar to that shown in FIG. 12, and is adapted to generate output designation data for altering the channel process means in case the channel process group including the fixed wavelength reception unit which has received the packet is different from the channel process group including the separation-insertion means to which the destination terminal of the packet is connected. Also the flag process unit 71 is adapted to set the address flag in case the channel address of the input packet coincides with either of the channel process groups including the two separation-insertion units connected through the output terminals. A filter 86 intercepts the optical signals of λj and λk among the optical signals of eight wavelengths released from the divider 82 and transmits the remaining optical signals to a multiplexer 91. Separation-insertion units IX(87) and X(88) constitute separation-insertion means and are adapted, as in the second embodiment, to separate the packet only if the address flag is set and the node address thereof coincides with that of this node device. Fixed wavelength transmission units IX(89) and X(90) constitute fixed wavelength transmission means utilizing semiconductor laser as in the foregoing embodiments. Transmission wavelengths λj and λk are respectively assigned to the fixed wavelength transmission units IX(89) and X(90). A multiplexer 91 synthesizes the optical signals of wavelengths λj and λk respectively transmitted from the fixed wavelength transmission units IX(89) and X(90) and optical signals of other wavelengths transmitted by the filter 86 for supply to an optical fiber 29. Sub transmission paths IX(92) and X(93) serve as sub transmission paths for packet between the separation-insertion units and the terminals. Terminals IX(94) and X(95) are respectively connected to the sub transmission paths IX(92) and X(93).

Figure 18:
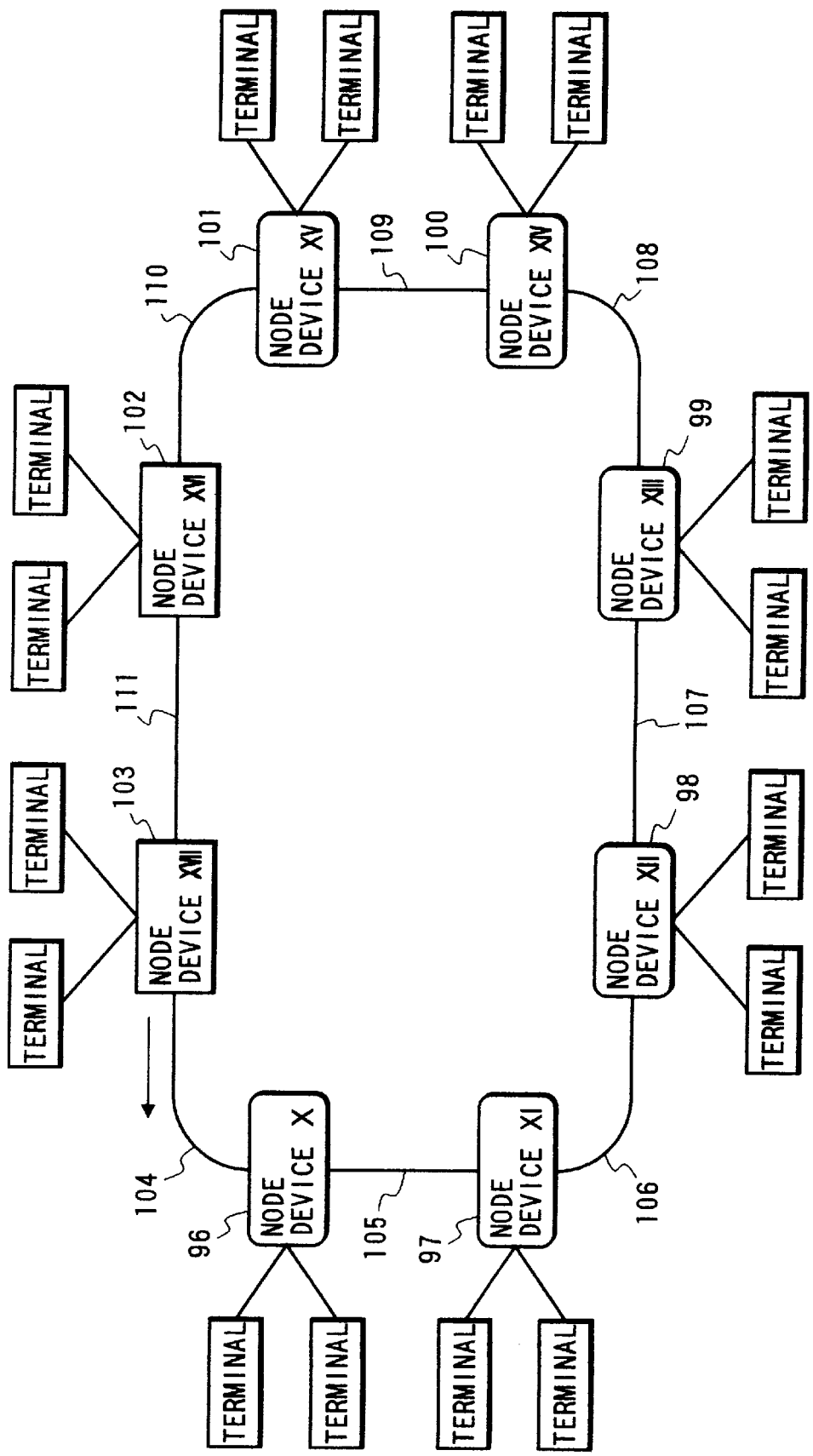
FIG. 18 is a view showing the configuration of a network system in the fourth embodiment of the present invention.

FIG. 18 shows an example of the configuration of the network system of the fourth embodiment, employing eight node devices shown in FIG. 17, wherein arrow indicates the direction of transmission.

In FIG. 18, each of node devices 96–103 is constructed as shown in FIG. 17 and is connected to two terminals through two sub transmission paths. The node devices are divided into groups in each of which the assigned wavelength does not mutually overlap, and are assigned with the node addresses as shown in Table 5. Optical fibers 104–111 constitute physical media of the optical wavelength multiplex transmission path and are related with the optical fibers shown in FIG. 17, in a similar manner as in the first embodiment of the present invention.

The wavelengths λj, λk are assigned to the fixed wavelength reception units IX(83), X(84) and the fixed wavelength transmission units IX(89), X(90) in each node device as shown in Table 6. As in the first embodiment of the present invention, a fixed wavelength reception unit, a separation-insertion unit and a fixed wavelength transmission unit utilizing a same wavelength constitute a channel process group. The packet used in the present fourth embodiment is same, in configuration, as that shown in FIG. 13.

TABLE 5

| NODE DEVICE | NODE ADDRESS |
| --- | --- |
| Node device X | 1 |
| Node device XI | 1 |
| Node device XII | 1 |
| Node device XIII | 1 |
| Node device XIV | 2 |
| Node device XV | 2 |
| Node device XVI | 2 |
| Node device XVII | 2 |

TABLE 6

| NODE DEVICE | WAVELENGTH λj | WAVELENGTH λk |
| --- | --- | --- |
| Node device X | λ1 | λ2 |
| Node device XI | λ3 | λ4 |
| Node device XII | λ5 | λ6 |
| Node device XIII | λ7 | λ8 |
| Node device XIV | λ2 | λ3 |
| Node device XV | λ4 | λ5 |
| Node device XVI | λ6 | λ7 |
| Node device XVII | λ8 | λ1 |

λj is the wavelength used by fixed wavelength reception unit IX(83) and fixed wavelength transmission unit IX(89);
λk is the wavelength used by fixed wavelength reception unit X(90) and fixed wavelength transmission unit X(84).

In the following there will be explained the function of the fourth embodiment of the present invention, with reference to the attached drawings, taking an example of packet transmission from a terminal X(95) connected to the sub transmission path X(93) of the node device X(96) to a destination terminal IX(94) connected to the sub transmission path IX(92) of the node device XV(101). In the following description, said packet will be called packet D, and same components in different node devices will be represented, as in the description of the foregoing embodiments, by a same number in the attached drawings.

The transmitting terminal X(95) connected to the sub transmission path X(93) of the node device X(96) generates the packet D of the configuration shown in FIG. 13, by adding, to the data to be addressed to the terminal IX(94) connected to the sub transmission path IX(92) of the node device XV(101), a channel address and a node address and resetting the address flag, and transmits said packet D through the sub transmission path X(93) to the separation-insertion unit X(88) of the node device X(96). In this state, the channel address is set at "4" since the destination terminal IX(94) is connected to the node device XV(101) and is connected through the sub transmission path to the separation-insertion unit IX(87) which belongs to the channel process group utilizing a wavelength $\lambda 4$ as shown in Table 6. Also the node address is set at "2" according to Table 5, since the packet D is addressed to the node device XV(101).

The separation-insertion unit X(88) of the node device X(96) inserts, as in the foregoing embodiments, the packet D from the sub transmission path X(93) into the packet flow released from the change-over switch 85 for supply to the fixed wavelength transmission unit X(90). As said transmission unit X(90) is assigned to transmit the optical signal of $\lambda 2$ as shown in Table 6, the packet D is converted into an optical signal of $\lambda 2$, and is then synthesized, in the multiplexer 91, with the optical signal of $\lambda 1$ transmitted from the fixed wavelength transmission unit IX(89) and the optical signals of other wavelengths which are transmitted from the fixed wavelength transmission units of the upstream node devices, then divided by the divider 82 of the node device X(96) toward the filter 86 and transmitted by said filter 86, and enters the optical fiber 29. As the optical signals of $\lambda 1$ and $\lambda 2$ transmitted from the upstream node devices are intercepted by the filter 86, the optical signals of $\lambda 1$ and $\lambda 2$ released from the fixed wavelength transmission units IX(89) and X(90) can be transmitted to the adjacent downstream node device XI(97) without interference by the optical signals of the same wavelengths from other node devices.

As shown in Table 6, the node device XI(97) is assigned to process the optical signals of $\lambda 3$ and $\lambda 4$. Consequently, the packet D, transmitted as an optical signal of $\lambda 2$ is not received by the fixed wavelength reception unit IX(83) or X(84). As the filter 86 of the node device XI(97) intercepts the optical signals of $\lambda 3$ and $\lambda 4$ but passes other optical signals, the packet D is passed by the filter 86, then enters the optical fiber 29 through the multiplexer 91, and is transmitted to the node device XII(98). As the node devices XII(98) and XIII(99) are not assigned to process the optical signal of $\lambda 2$, the packet D is passed by these node devices, as in the case of the node device XI(97), and is transmitted to the node device XIV(100).

The packet D, transmitted as the optical signal of $\lambda 2$, is subjected, in the node device XIV(100), to a change of the channel process group. The packet D, transmitted from the node device 96 as the optical signal of $\lambda 2$, is received by the fixed wavelength reception unit IX(83) and sent to the changeover switch 85. The channel address of said packet D is latched by a latch 137 of the decoder 129 of said switch 85 and is supplied to comparators I–VIII. As the channel address of the packet D is set at "4" as explained before while the memories I–VIII respectively store "1" to "8", the comparator IV generates a coincidence signal to generate a predetermined address from the table address generator whereby the output designation data are read from the output designation table. The fixed wavelength reception unit IX(83) which has sent the packet to the decoder is designated to only receive the packet flow transmitted by the channel of $\lambda 2$ and belongs to the channel process group "2" which is different from the channel address "4" of the packet D, so that the output designation data from the output designation table instruct to send the packet D to the separation-insertion unit X(88) to alter the channel process unit. Also as the channel address "4" does not coincide with the channel process group "2" of the separation-insertion unit IX(87) or the channel process group "3" of the separation-insertion unit X(88), the flag process unit sends the packet D, with the address flag in the reset state, to the separation-insertion unit X(88). Out of the packet D supplied to the separation-insertion unit X(88), the address flag and the node address are latched by the latch 60. The comparator 59 compares the address flag with a value indicating the set state, and also compares the node address with the reference input value "2". As a result, though the node address shows coincidence but the address flag is not set, the comparator 59 sends a relay instruction signal to the demultiplexer 61, which in response stores the packet D in the FIFO II(64). The packet D stored in the FIFO II(64) is read therefrom under the control of the insertion control unit 65, and is transmitted from the fixed wavelength transmission unit X(90), as an optical signal of $\lambda 3$, to the node device XV(101).

The node devices XV(101), XVI(102), XVII(103) and X(96) are not designed to process the channel of the optical signal of $\lambda 3$, so that the packet D is passed by said node devices, as in the node device XI(97), and reaches the node device XI(97).

The packet D, transmitted to the node device XI(97) as an optical signal of $\lambda 3$, is again subjected therein to the alteration of the channel process group. The packet D, transmitted from the node device XIV(100) as the optical signal of $\lambda 3$, is received by the fixed wavelength reception unit IX(83) and is supplied to the change-over switch 85. As the decoder 129 of said change-over switch 95 identifies, as in the foregoing node device XIV(100), that the channel address "4" is different from the channel process group "3" of the fixed wave reception unit IX(83) which has sent the packet to said decoder, there is conducted an alteration of the channel process group whereby output designation data, for sending the packet to the separation-insertion unit X(88), are read from the output designation table. On the other hand, as the channel address "4" coincides with the channel process group "4" of the separation-insertion unit X(88), the flag process unit sets the address flag and sends the packet to the separation-insertion unit X(88). Out of the packet D stored in the separation-insertion unit X(88), the address flag and the node address are latched in the latch 60. The comparator 59 compares the address flag with a value indicating the set state, and also compares the node address with the reference input value "2". As a result, though the address flag is set, the node address does not show coincidence, so that the comparator 59 sends a relay instruction signal to the demultiplexer 61, whereby the packet D is transmitted from the fixed wavelength transmission unit X(90), as an optical signal of $\lambda 4$, to the node device XII(98).

Since the node devices XII(98), XIII(99) and XIV(100) are not designed to process the channel of the optical signal of $\lambda 4$, the packet D is passed by these node devices and transmitted to the node device XV(101).

The packet D, transmitted as an optical signal of $\lambda 4$ to the node device XV(101) is separated to the destination terminal IX(94) connected to the sub transmission path IX(94) of the node device XV(101). The packet D, being transmitted from the node device XI(97) as the optical signal of $\lambda 4$, is received by the fixed wavelength reception unit IX(83) and is supplied to the change-over switch 85. As the channel address "4" coincides with the channel process group "4" including the fixed wavelength reception unit IX(83) which has sent the packet to the decoder 129 of the change-over switch 85, said decoder 129 does not effect alteration of the channel process group and output designation data, for delivering the packet D to the separation-insertion unit IX(87), are read from the output designation table. On the other hand, as the channel address "4" coincides with the channel process group "4" of the separation-insertion unit IX(87), the flag process unit maintains the address flag in the set state and sends the packet D to the separation-insertion unit IX(87). Out of the packet D stored in the separation-insertion unit IX(87), the address flag and the node address are latched in the latch 60. The comparator 59 compares the address flag with a value indicating the set state, and also compares the node address with the reference input value # which is the address "2" of the node device XV(101). As a result, since the address flag is in the set state and the node address shows coincidence, the comparator 59 sends a separation instruction signal to the demultiplexer 61, which in response delivers the input packet D to the I/F unit 62. Said packet D is then transmitted through the sub transmission path IX(92), then received by the destination terminal IV(94), subjected to elimination of the address section from the packet and the data section alone is taken out and processed in desired manner.

As explained in the foregoing, the packet D, addressed from the transmitting terminal X(95), connected to the sub transmission path X(93) of the node device X(96), to the destination terminal IX(94) connected to the sub transmission path IX(92) of the node device XV(101), in the state of an optical signal of a wavelength of λ2, is subjected in the node device XIV(100) to the alteration of the channel process group to the channel corresponding to the optical signal of λ3, then further subjected in the node device IX(97) to the alteration of the channel process group to the channel corresponding to the optical signals of λ4, then separated in the node device XV(101) and transmitted to the terminal IX(94).

In the present embodiment, each node device simply passes the optical signal of a channel which said node device is not designed to process, but such an optical signal may be subjected to conversion to an electrical signal, amplification and regeneration to an optical signal, or may be amplified in the state of the optical signal.

Also in the present embodiment, all the node devices have the configuration shown in FIG. 17, but a network system may also be constructed with a plurality of the node devices in which the change-over switch 85 is eliminated from the configuration shown in FIG. 17 and the node devices V(67) employed in the second embodiment, said node devices being connected by a multi-channel transmission path.

Also in the present embodiment, since the number of terminals connected to each node device is less in comparison with that in the foregoing embodiments, the distance between each terminal and the node device can be made shorter in compassion with that in the foregoing embodiments, for a given number of the terminals.

Also in the present embodiment, the alteration of the input-output connections can be made fast, since each node device corresponds only to two channels and is only required to discriminate whether the channel of packet transmission coincides with the channel address of the packet. If the node device corresponds to three or more channels, the output terminal for the packet is determined by decoding the channel address as in the first or second embodiment. Also the packet transmission can be achieved without trouble, even if the node devices in the network system are different in the numbers of corresponding channels.

Embodiment 5

Figure 19:
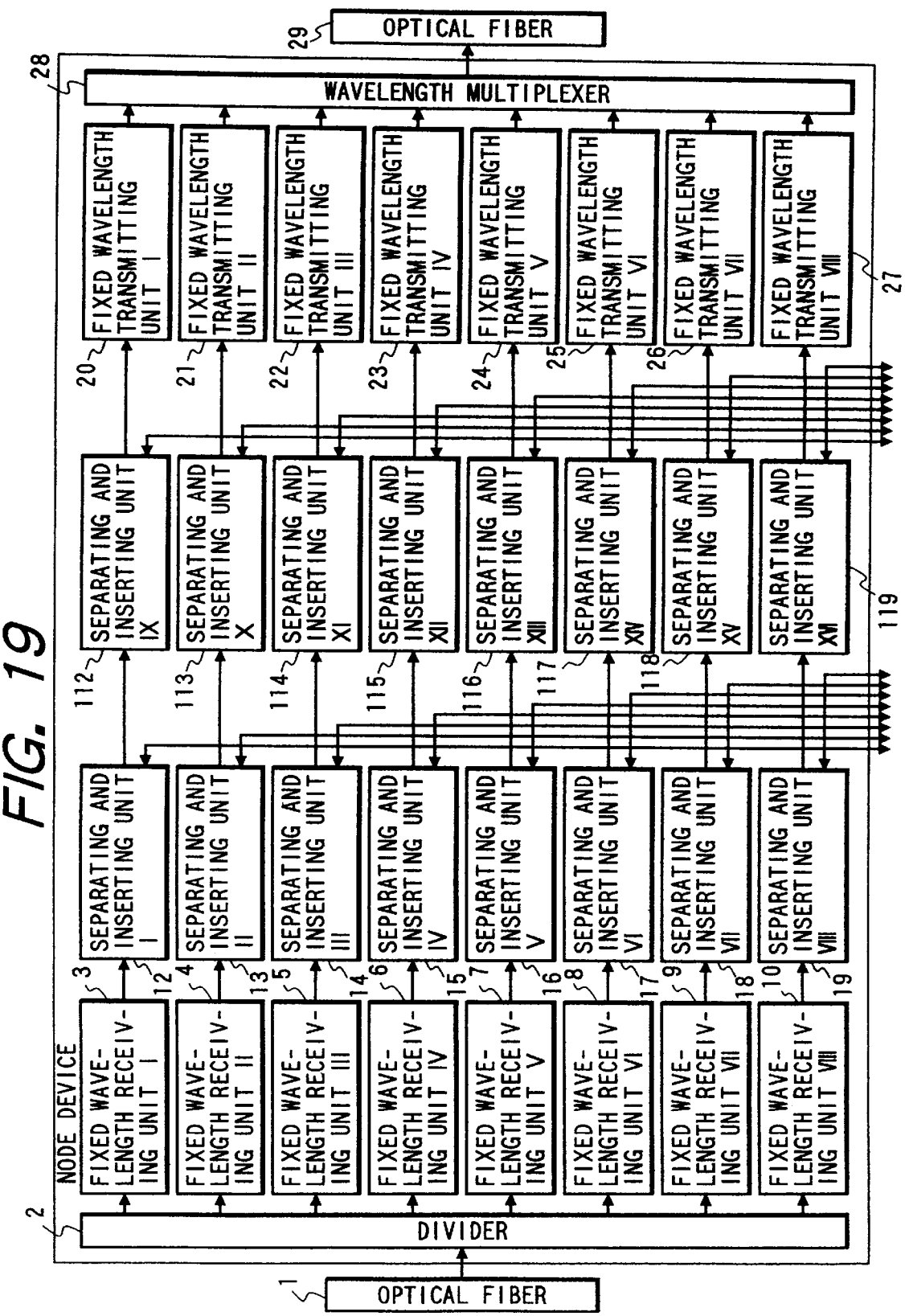
FIG. 19 is a view showing the configuration of a node device constituting a fifth embodiment of the present invention.

FIG. 19 shows the configuration of a node device employed in the fifth embodiment of the present invention, wherein each process means has plural (two) separation-insertion means. In the present embodiment, the plural separation-insertion means of each channel process means physically constitute a part of a node device but can be made to logically function as two node devices by assignment of different node addresses. It is thus made possible to connect terminals of a larger number to each node device. Such node device can be used in a similar manner as the node device shown in FIG. 6.

Embodiment 6

In the foregoing embodiments, there are disclosed networks constructed by connecting plural node devices with an optical fiber, but the present invention is not limited to such configurations. The present embodiment provides a network as shown in FIG. 20.

Figure 20:
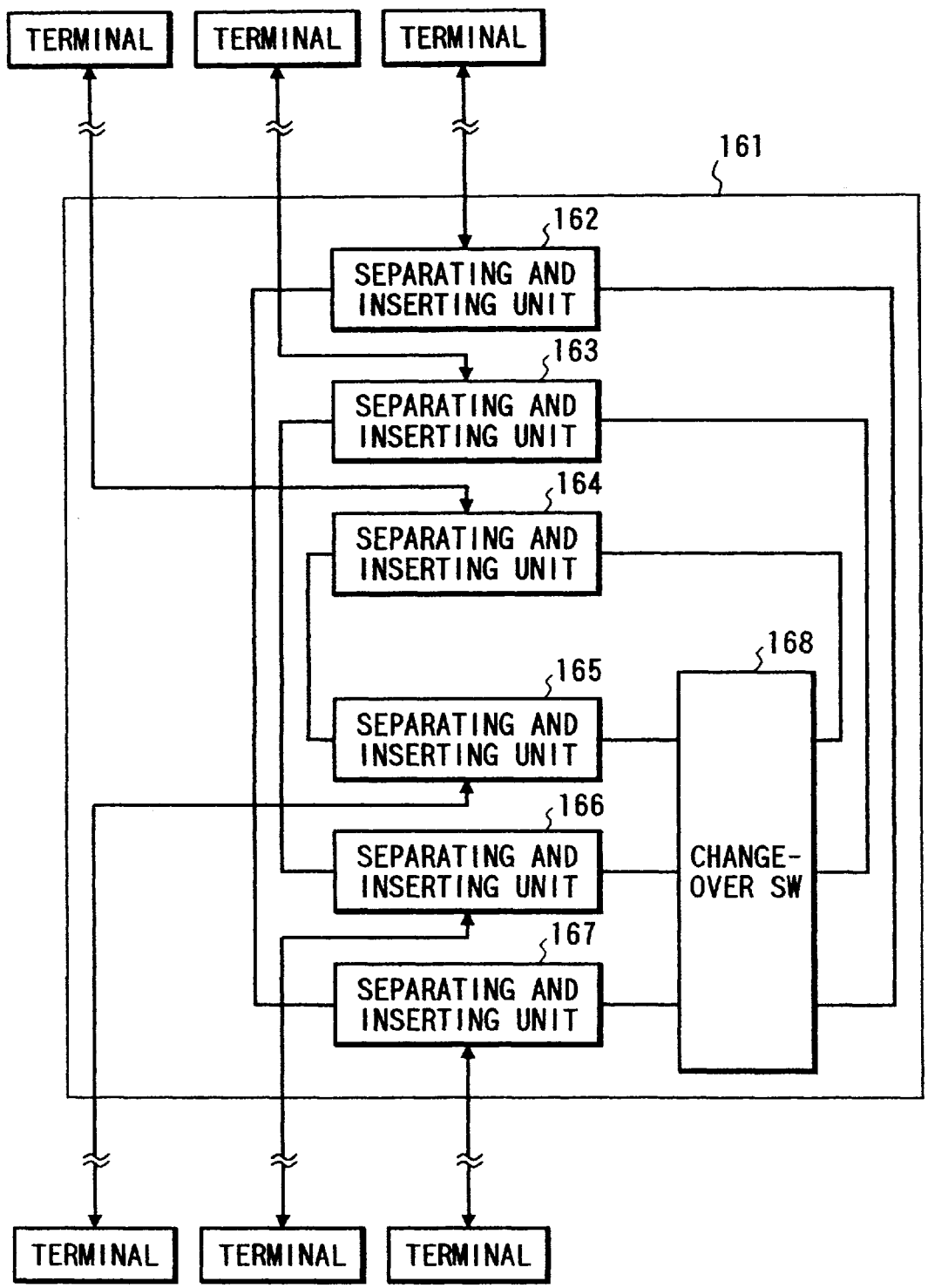
FIGS. 20 and 21 are views showing the configuration of a network system and a concentrator constituting a sixth embodiment of the present invention.

In FIG. 20, separation-insertion units 162–167 and a change-over switch 168 are incorporated in a concentrator 161, wherein said separation-insertion units in said concentrator have the functions similar to those of the node devices in the foregoing embodiments, and said separation-insertion units are respectively connected to terminals through mutually different cables. In this embodiment, the signal transmission is conducted with an electrical signal, and the plural electrically conductive paths in the concentrator are used as the multi-channel transmission path, but the transmission is conducted within the concentrator in a similar procedure as in the network of the second embodiment. Also in the present embodiment, as the signal transmission is conducted with the electrical signal and the conductive path is not multiplexed by wavelength, there are not required means for receiving each channel in separate manner and transmission means for each channel.

Also as a modification of the present embodiment, there can be conceived a configuration in which the number of the separation-insertion means is made different among the channels. In the present embodiment, the packet is not required to have information for identifying the node device but is only required to have information for identifying the separation-insertion means, so that the number of the separation-insertion means may be made different among different channels.

It is also possible, in the present embodiment, to employ optical transmission in all the transmission paths, or to employ optical transmission only in the transmission paths between the separation-insertion units and the terminals thereby extending the distance between the concentrator and each terminal.

Embodiment 7

Figure 21:
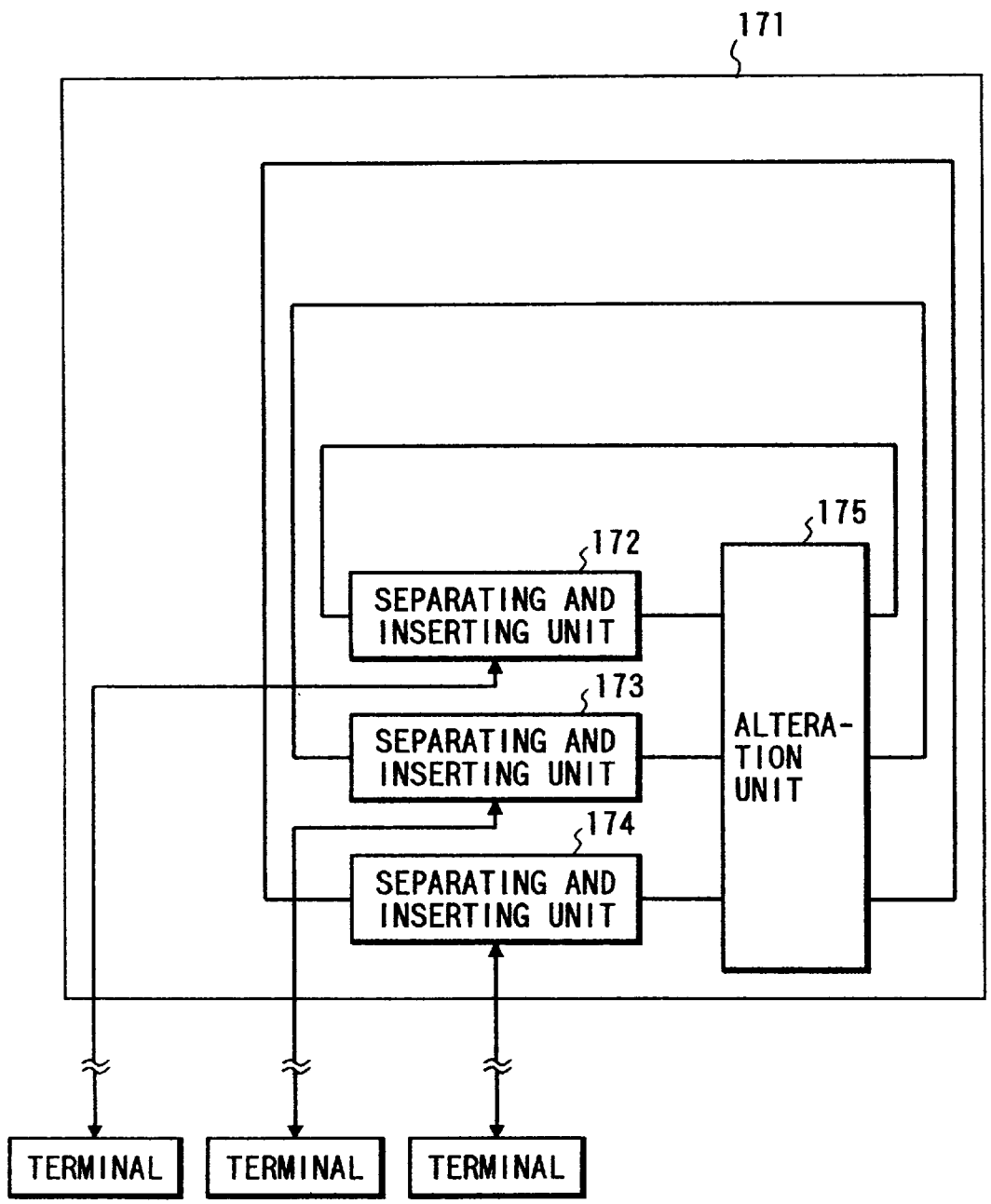

FIG. 21 shows the configuration of a network constituting a seventh embodiment. Separation-insertion units 172, 173, 174 respectively correspond to three channels in a concentrator 171, and an alteration unit 175 functions similar to that in FIG. 15. In this configuration, the transmission can be achieved among the terminals as in the third embodiment, by flag setting in the alteration unit when the transmission channel is altered to a channel coinciding with the channel address of the packet.

Other embodiments

In the foregoing embodiments, the means for altering the input-output connections, such as the change-over switch or the alteration unit, is provided between the fixed wavelength transmission unit and the separation-insertion unit, but such position is not limitative and said means may also be provided between the separation-insertion unit and the fixed wavelength transmission unit. It may also be provided in the node device. In such case, if optical signal is employed, there are provided a reception unit for converting the optical signal into an electrical signal, for the input-output connection alteration means, and transmission means for converting the electrical signal into an optical signal.

Also in the foregoing embodiments, it is assumed that the fixed wavelength reception and the fixed wavelength transmission unit in each channel process means utilize a same wavelength, but they may utilize different wavelengths. Thus, each channel process group need not to utilize a physically same wavelength but is only required to utilize a logically same channel.

Also the foregoing embodiments utilize a multichannel transmission path utilizing wavelength multiplexing, but there may also be employed a spatially-multiplex multi-channel transmission path utilizing plural optical fibers.

Also instead of optical transmission, there may be employed an electrical multi-channel transmission path utilizing, for example, frequency multiplexing, spatial multiplexing, time-shared multiplexing or code multiplexing.

In case of a multiplexing method requiring means for receiving each of the multiplexed channels, as in the case of wavelength multiplexing, the configuration of the foregoing embodiments having a dividing unit, corresponding to plural channels, in each node device, is simpler in comparison with such a configuration in which the dividing unit is provided in an arbitrary position on each channel. It also facilitates installation and maintenance of the network system.

The second, fifth or sixth embodiment employs only one input-output connection alteration means within the network, but there may also be employed a plurality of such means, thereby improving the efficiency of channel alteration, reducing the transmission distance and elevating the throughput.

Also in the first embodiment, the input-output alteration means is not required to attach, to the packet, the information indicating the effectiveness of the node address, but such information may be added, as in the second embodiment, by the input-output alteration means at the alteration to the channel matching the channel address of the packet in order to ensure such alteration, for the purpose of improving the efficiency of use of each channel or decreasing the delay in transmission.

Also in the foregoing embodiments, the separation unit for separating a packet and the insertion unit for inserting a packet are united as a separation-insertion unit, but they may be provided as separate units. In such case the separation unit is preferably positioned upstream of the insertion unit. In such case it is furthermore preferably to provide the separation unit and the insertion unit respectively at the upstream and downstream sides of the input-output connection alteration means, since a packet altered to a predetermined channel need not be passed by the input-output connection alteration means of the node device including the separation means used for separating said packet.

Also there is only one transmission path is provided between the separation-insertion unit and the terminal, but there may be provided transmission paths respectively between the separation unit and the terminal and between the insertion unit and said terminal, and said transmission paths may also be multiplexed. Such configuration will enable simultaneous separation and insertion.

Also the combinations of the node device in the foregoing embodiments are not limited to those in said embodiments, but other various combinations are possible as long as at least one input-output connection alteration means is provided in the network and two-dimensional addressing is conducted in combination with the separation means.

In the network system, node device and transmission control method of the present invention, as explained in the foregoing, the input-output connection alteration means is only required to alter the channel process means employed for processing the packet, according to the information for identifying the channel process means for the packet, and can therefore be simplified in configuration, in comparison with the conventional exchange unit which is larger in the hardware magnitude and higher in cost. Consequently it is rendered possible to reduce the magnitude of the hardware of the node device and to provide an inexpensive node device.

Also as the number of inputs and outputs of the alteration means does not depend on the number of connected terminals but only on the number of channels in the multi-channel transmission path, there can be avoided the drawback of significant increase in the hardware magnitude with the increase of number of the connected terminals.

Also within the network system there is only required at least one alteration means, and other node devices can be made simpler, without such alteration means. It is therefore possible to reduce the cost required for the connection of the terminals to the network system.

Furthermore, the decoder of the alteration means is only required to decode the information for identifying the channel process means and is not required to compare, as in the conventional decoder, the destination address of the packet with the addresses of all the terminals connected to the network system. Consequently, even when the number of the terminals connected to the network system increases, the magnitude of the hardware does not become large, so that the node device does not become expensive. It is also made possible to achieve high-speed address decoding and high-speed operation of the network system.

It is also possible to prevent erroneous separation of the packet by the separation-insertion means, prior to the alteration to the desired channel process group, by separation and delivery of the desired packet to the terminal according to the node device identifying information and the effectiveness information of the packet.

What is claimed is:

1. A network system for effecting communication utilizing a multi-channel transmission path consisting of a plurality of channels numbering n in total, said network system comprising:

switch means comprising
   (a) n input terminals respectively corresponding to the plurality of channels and
   (b) n output terminals respectively corresponding to the plurality of channels, for selectively delivering a signal inputted from any of said n input terminals to one of said n output terminals corresponding to a same or different channel of the plurality of channels; and separation means corresponding to at least one of the plurality of channels for determining whether or not to separate a desired signal therefrom and for outputting the separated signal to a sub-transmission path connected to said separation means.

2. A network system according to claim 1, wherein the signal has a destination address indicating the destination of the signal, and the destination address is composed of:

(a) a channel address indicating a channel to which said separation means corresponds; and (b) a separation means address indicating whether or not said separation means is to be used for separating the signal and for outputting the separated signal to the sub-transmission path.

3. A network system according to claim 1, wherein said switch means is a switch.

4. A network system according to claim 2, wherein said switch means determines, in accordance with the channel address of the signal, an output terminal of said n output terminals for delivering the signal.

5. A network system according to claim 1, wherein the signal has a destination address indicating the destination of the signal, and when outputting a signal to an output terminal of said n output terminals corresponding to a channel to which said separation means also corresponds, said switch means attaches effectiveness information to the signal, indicating that the destination address of the signal is effective.

6. A network system according to claim 5, wherein the destination address is composed of:

(a) a channel address indicating a channel to which said separation means corresponds; and (b) a separation means address indicating whether or not said separation means is to be used for separating the signal and for outputting the separated signal to the sub-transmission path, and wherein the effectiveness information indicates that the separation means address is effective.

7. A network system according to claim 1, wherein said switch means connects each of said n input terminals with a respectively non-corresponding one of said n output terminals.

8. A network system according to claim 7, wherein the signal has a destination address indicating the destination of the signal, and when outputting a signal to an output terminal of said n output terminals corresponding to a channel to which said separation means also corresponds, said switch means attaches effectiveness information to the signal, indicating that the destination address of the signal is effective.

9. A network system according to claim 8, wherein the destination address is composed of:

(a) a channel address indicating a channel to which said separation means corresponds; and (b) a separation means address indicating whether or not said separation means is to be used for separating the signal and for outputting the separated signal to the sub-transmission path, and wherein the effectiveness information indicates that the separation means address is effective.

10. A network system according to claim 1, further comprising insertion means for inserting a signal on each channel of the plurality of channels of the multi-channel transmission path.

11. A network system according to claim 10, wherein said separation means and said insertion means are provided in a node device.

12. A network system according to claim 11, wherein said separation means and said insertion means correspond to each of the plurality of channels.

13. A network system according to claim 11, wherein said separation means and said insertion means correspond to some but not all of the plurality of channels.

14. A network system according to claim 11, wherein said switch means is provided in said node device, and said switch means is provided between said separation means and said insertion means.

15. A network system according to claim 1, wherein said separation means is provided in a node device.

16. A network system according to claim 15, wherein said separation means corresponds to each of the plurality of channels.

17. A network system according to claim 15, wherein the signal has a destination address indicating the destination of the signal, and the destination address is composed of:

(a) a channel address indicating a channel to which said separation means corresponds; and (b) a separation means address indicating whether or not said separation means is to be used for separating the signal and for outputting the separated signal to the sub-transmission path, and wherein the separation means address is an address of said node device.

18. A network system according to claim 15, wherein said switch means is provided in said node device.

19. A network system according to claim 1, wherein said switch means and said separation means are provided in each of a plurality of node devices.

20. A network system according to claim 15, wherein said separation means corresponds to some but not all of the plurality of channels.

21. A network system according to claim 15, wherein the plurality of channels are multiplexed in the multi-channel transmission path, and wherein said node device further comprises (a) reception means for separately receiving each channel of the plurality of channels to which said separation means corresponds and (b) transmission means for separately transmitting each channel of the plurality of channels to which said separation means corresponds.

22. A network system according to claim 21, wherein, in said node device, said separation means is provided between said reception means and said transmission means.

23. A network system according to claim 22, wherein said switch means is provided in said node device, and said switch means is provided either between said reception means and said separation means, or between said separation means and said transmission means.

24. A network system according to claim 1, wherein said switch means is provided in only one unit in said network system.

25. A network system according to claim 1, wherein the multi-channel transmission path, said separation means and said switch means are provided in a concentrator.

26. A network system according to claim 1, wherein the plurality of channels are lights of respectively different wavelengths, and the multi-channel transmission path is a wavelength-multiplexed transmission path.

27. A network system according to claim 1, wherein the plurality of channels are respectively different transmission paths, and the multi-channel transmission path is composed of the different transmission paths.

28. A network system according to claim 26 or 27, wherein the transmission path is an optical fiber.

29. A node device adapted for use in a network system for effecting communication utilizing a multi-channel transmission path consisting of a plurality of channels numbering n in total, said system comprising switch means comprising (a) n input terminals respectively corresponding to the plurality of channels and (b) n output terminals respectively corresponding to the plurality of channels, for selectively delivering a signal inputted from any of said n input terminals to one of said n output terminals corresponding to a same or different channel of the plurality of channels, said node device comprising:

separation means corresponding to each of the plurality of channels for determining whether or not to separate a desired signal therefrom and to output the separated signal to a sub-transmission path connected to said separation means.

30. A node device according to claim 29, wherein the signal has a destination address indicating the destination of the signal, and the destination address is composed of:

(a) a channel address indicating a channel to which said separation means corresponds; and (b) a separation means address indicating whether or not said separation means is to be used for separating the signal and for outputting the separated signal to the sub-transmission path.

31. A node device according to claim 30, wherein said separation means determines, in accordance with the separation means address, whether or not to separate a signal.

32. A node device according to claim 29, further comprising insertion means, corresponding to each of the plurality of channels, for inserting a signal on a channel.

33. A node device according to claim 30, wherein the separation means address is an address of said node device.

34. A node device according to claim 29, wherein the plurality of channels are multiplexed in the multi-channel transmission path, and said node device further comprises (a) reception means for separately receiving each channel of the plurality of channels and (b) transmission means for separately transmitting each channel.

35. A node device according to claim 34, wherein said separation means is provided between said reception means and said transmission means.

36. A node device according to claim 34, wherein the plurality of channels are lights of respectively different wavelengths, and wherein said reception means receives the wavelength of each corresponding channel of the plurality of channels, and said transmission means transmits the wavelength of each corresponding channel.

37. A node device for use in a network system for effecting communication utilizing a multi-channel transmission path consisting of a plurality of channels numbering n in total, said node device comprising:

switch means comprising (a) n input terminals respectively corresponding to the plurality of channels and (b) n output terminals respectively corresponding to the plurality of channels, for selectively delivering a signal inputted from any of said n input terminals to one of said n output terminals corresponding to a same or different channel of the plurality of channels; and separation means corresponding to each of the plurality of channels for determining whether or not to separate a desired signal therefrom and for outputting the separated signal to a sub-transmission path connected to said separation means.

38. A network system according to claim 37, wherein the signal has a destination address indicating the destination of the signal, and the destination address is composed of:

(a) a channel address indicating a channel to which said separation means corresponds; and (b) a separation means address indicating whether or not said separation means is to be used for separating the signal and for outputting the separated signal to the sub-transmission path.

39. A node device according to claim 37, wherein said switch means is a switch.

40. A node device according to claim 39, wherein the signal has a destination address indicating the destination of the signal, and the destination address is composed of:

(a) a channel address indicating a channel to which said separation means corresponds; and (b) a separation means address indicating whether or not said separation means is to be used for separating the signal and for outputting the separated signal to the sub-transmission path, and wherein said switch means determines, in accordance with the channel address of the signal, an output terminal of said n output terminals for delivering the signal.

41. A node device according to claim 39, wherein the signal has a destination address indicating the destination of the signal, and when outputting a signal to an output terminal of said n output terminals corresponding to a channel to which said separation means also corresponds, said switch means attaches effectiveness information to the signal, indicating that the destination address of the signal is effective.

42. A node device according to claim 39, wherein the signal has a destination address indicating the destination of the signal, and the destination address is composed of:

(a) a channel address indicating a channel to which said separation means corresponds; and (b) a separation means address indicating whether or not said separation means is to be used for separating the signal and for outputting the separated signal to the sub-transmission path, and wherein said separation means determines, in accordance with the separation means address, whether or not to separate a signal.

43. A node device according to claim 39, wherein the signal has a destination address indicating the destination of the signal, and the destination address is composed of:

(a) a channel address indicating a channel to which said separation means corresponds; and (b) a separation means address indicating whether or not said separation means is to be used for separating the signal and for outputting the separated signal to the sub-transmission path, and wherein when outputting a signal to an output terminal of said n output terminals corresponding to a channel to which said separation means also corresponds, said switch means attaches effectiveness information to the signal, indicating that the destination address of the signal is effective, and wherein said separation means determines, in accordance with the separation means address, whether or not to separate a signal having the effectiveness information indicating the separation means address is effective.

44. A node device according to claim 37, wherein said switch means connects the input terminals of said n input terminals with respectively non-corresponding output terminals of said n output terminals.

45. A node device according to claim 44, wherein the signal has a destination address indicating the destination of the signal, and when outputting a signal to an output terminal of said n output terminals corresponding to a channel to which said separation means also corresponds, said switch means attaches effectiveness information to the signal, indicating that the destination address of the signal is effective.

46. A node device according to claim 44, wherein the signal has a destination address indicating the destination of the signal, and the destination address is composed of:

(a) a channel address indicating a channel to which said separation means corresponds; and (b) a separation means address indicating whether or not said separation means is to be used for separating the signal and for outputting the separated signal to the sub-transmission path, and wherein said separation means determines, in accordance with the separation means address, whether or not to separate a signal.

47. A node device according to claim 44, wherein the signal has a destination address indicating the destination of the signal, and the destination address is composed of:

(a) a channel address indicating a channel to which said separation means corresponds; and (b) a separation means address indicating whether or not said separation means is to be used for separating the signal and for outputting the separated signal to the sub-transmission path, wherein when outputting a signal to an output terminal of said n output terminals corresponding to a channel to which said separation means also corresponds, said switch means attaches effectiveness information to the signal, indicating that the destination address of the signal is effective, and wherein said separation means determines, in accordance with the separation means address, whether or not to separate a signal having the effectiveness information indicating the separation means address is effective.

48. A node device according to claim 37, further comprising insertion means, corresponding to each channel of the plurality of channels in the multi-channel transmission path, for inserting a signal on a channel.

49. A node device according to claim 48, wherein said switch means is provided between said separation means and said insertion means.

50. A node device according to claim 37, wherein the signal has a destination address indicating the destination of the signal, and the destination address is composed of:

(a) a channel address indicating a channel to which said separation means corresponds; and (b) a separation means address indicating whether or not said separation means is to be used for separating the signal and for outputting the separated signal to the sub-transmission path, and wherein the separation means address is an address of said node device.

51. A node device according to claim 37, wherein the plurality of channels are multiplexed in the multi-channel transmission path, and said node device further comprises (a) reception means for separately receiving each channel of the plurality of channels and (b) transmission means for separately transmitting each channel of the plurality of channels.

52. A node device according to claim 51, wherein said separation means is provided between said reception means and said transmission means.

53. A node device according to claim 52, wherein said switch means is provided either between said reception means and said separation means, or between said separation means and said transmission means.

54. A node device according to claim 51, wherein the plurality of channels are lights of respectively different wavelengths, and wherein said reception means receives the wavelength of each corresponding channel of the plurality of channels, and said transmission means transmits the wavelength of each corresponding channel.

55. A node device adapted for use in a network system for effecting communication utilizing a multi-channel transmission path consisting of a plurality of channels numbering n in total, said system comprising switch means comprising (a) n input terminals respectively corresponding to the plurality of channels and (b) n output terminals respectively corresponding to the plurality of channels, for selectively delivering a signal inputted from any of said n input terminals to one of said n output terminals corresponding to a same or different channel of the plurality of channels, said node device comprising:

separation means corresponding to some but not all of the plurality of channels for determining whether or not to separate a desired signal therefrom and for outputting the separated signal to a sub-transmission path connected to said separation means.

56. A node device according to claim 55, wherein the signal has a destination address indicating the destination of the signal, and the destination address is composed of:

(a) a channel address indicating a channel to which said separation means corresponds; and (b) a separation means address indicating whether or not said separation means is to be used for separating the signal and for outputting the separated signal to the sub-transmission path.

57. A node device according to claim 56, wherein said separation means determines, in accordance with the separation means address, whether or not to separate a signal.

58. A node device according to claim 55, further comprising insertion means, corresponding to a channel in the multi-channel transmission path to which said separation means also corresponds, for inserting a signal on the channel.

59. A node device according to claim 56, wherein the separation means address is an address of said node device.

60. A node device according to claim 55, wherein the plurality of channels are multiplexed in the multi-channel transmission path, and said node device further comprises (a) reception means for separately receiving each channel of the plurality of channels corresponding to said separation means and (b) transmission means for separately transmitting each channel of the plurality of channels corresponding to said separation means.

61. A node device according to claim 60, wherein said separation means is provided between said reception means and said transmission means.

62. A node device according to claim 60, wherein the plurality of channels are lights of respectively different wavelengths, and wherein said reception means receives the wavelength of each corresponding channel of the plurality of channels, and said transmission means transmits the wavelength of each corresponding channel.

63. A node device according to claim 55, wherein said node device further comprises passing means for passing a signal of a channel of the plurality of channels not corresponding to said separation means.

64. A node device for use in a network system for effecting communication by connecting, with a multi-channel transmission path consisting of a plurality of channels numbering n in total, a plurality of said node devices each accessing at least two of the plurality of channels in such a manner that all of the plurality of channels can be accessed by one or another of said plurality of node devices, said node device comprising:

switch means comprising
   (a) input terminals and
   (b) output terminals, for selectively delivering a signal inputted from any of said input terminals to any of said output terminals; and
  separation means corresponding to at least two of the plurality of channels for determining whether or not to separate a desired signal therefrom and for outputting the separated signal to a sub-transmission path connected to said separation means,
  wherein said input terminals respectively correspond to the at least two of the plurality of channels to which said separation means also corresponds, and said output terminals respectively correspond to the at least two of the plurality of channels to which said separation means also corresponds, and
  wherein said switch means selectively delivers a signal input from any of said input terminals to one of said output terminals corresponding to a same or different channel.

65. A node device according to claim 64, wherein the signal has a destination address indicating the destination of the signal, and the destination address is composed of:
  (a) a channel address indicating a channel to which said separation means corresponds; and
  (b) a separation means address indicating whether or not said separation means is to be used for separating the signal and for outputting the separated signal to the sub-transmission path.

66. A node device according to claim 64, wherein said switch means is a switch.

67. A node device according to claim 66, wherein the signal has a destination address indicating the destination of the signal, and the destination address is composed of:
  (a) a channel address indicating a channel to which said separation means corresponds; and
  (b) a separation means address indicating whether or not said separation means is to be used for separating the signal and for outputting the separated signal to the sub-transmission path, and
  wherein said switch means determines, in accordance with the channel address of the signal, an output terminal of said output terminals for delivering the signal.

68. A node device according to claim 64, wherein the signal has a destination address indicating the destination of the signal, and
  when outputting a signal to an output terminal of said output terminals corresponding to a channel to which said separation means also corresponds, said switch means attaches effectiveness information to the signal, indicating that the destination address of the signal is effective.

69. A node device according to claim 65, wherein said separation means determines, in accordance with the separation means address, whether or not to separate a signal.

70. A node device according to claim 65, wherein when outputting a signal to an output terminal of said output terminals corresponding to a channel to which said separation means also corresponds, said switch means attaches effectiveness information to the signal, indicating that the destination address of the signal is effective, and
  wherein said separation means determines, in accordance with the separation means address, whether or not to separate a signal having the effectiveness information indicating the separation means address is effective.

71. A node device according to claim 64, further comprising insertion means, corresponding to a channel in the multi-channel transmission path to which said separation means also corresponds, for inserting a signal on the channel.

72. A node device according to claim 71, wherein said switch means is provided between said separation means and said insertion means.

73. A node device according to claim 65, wherein the separation means address is an address of said node device.

74. A node device according to claim 64, wherein the plurality of channels are multiplexed in the multi-channel transmission path, and wherein said node device further comprises
  (a) reception means for separately receiving each channel of the plurality of channels corresponding to said separation means and
  (b) transmission means for separately transmitting each channel of the plurality of channels corresponding to said separation means.

75. A node device according to claim 74, wherein said separation means is provided between said reception means and said transmission means.

76. A node device according to claim 75, wherein said switch means is provided either between said reception means and said separation means, or between said separation means and said transmission means.

77. A node device according to claim 74, wherein the plurality of channels are lights of respectively different wavelengths, and
  wherein said reception means receives the wavelength of each corresponding channel of the plurality of channels, and said transmission means transmits the wavelength of each corresponding channel.

78. A node device according to claim 64, wherein said node device further comprises passing means for passing a signal of a channel of the plurality of channels not corresponding to said separation means.

79. A concentrator for use in a network system for effecting communication utilizing a multi-channel transmission path consisting of a plurality of channels numbering n in total, said concentrator comprising:
  switch means comprising
   (a) n input terminals respectively corresponding to the plurality of channels and
   (b) n output terminals respectively corresponding to the plurality of channels, for selectively delivering a signal inputted from any of said n input terminals to one of said n output terminals corresponding to a same or different channel of the plurality of channels;
  separation means corresponding to each of the plurality of channels for determining whether or not to separate a desired signal therefrom and for outputting the separated signal to a sub-transmission path connected to said separation means; and said multi-channel transmission path.

80. A concentrator according to claim 79, wherein the signal has a destination address indicating the destination of the signal, and the destination address is composed of:
   (a) a channel address indicating a channel to which said separation means corresponds; and
   (b) a separation means address indicating whether or not said separation means is to be used for separating the signal and for outputting the separated signal to the sub-transmission path.

81. A concentrator according to claim 79, wherein said switch means is a switch.

82. A concentrator according to claim 81, wherein the signal has a destination address indicating the destination of the signal, and the destination address is composed of:
   (a) a channel address indicating a channel to which said separation means corresponds; and
   (b) a separation means address indicating whether or not said separation means is to be used for separating the signal and for outputting the separated signal to the sub-transmission path, and
   wherein said switch means determines, in accordance with the channel address of the signal, an output terminal of said n output terminals for delivering the signal.

83. A concentrator according to claim 81, wherein the signal has a destination address indicating the destination of the signal, and
   when outputting a signal to an output terminal of said n output terminals corresponding to a channel to which said separation means also corresponds, said switch means attaches effectiveness information to the signal, indicating that the destination address of the signal is effective.

84. A concentrator according to claim 81, wherein the signal has a destination address indicating the destination of the signal, and the destination address is composed of:
   (a) a channel address indicating a channel to which said separation means corresponds; and
   (b) a separation means address indicating whether or not said separation means is to be used for separating the signal and for outputting the separated signal to the sub-transmission path, and
   wherein said separation means determines, in accordance with the separation means address, whether or not to separate a signal.

85. A concentrator according to claim 81, wherein the signal has a destination address indicating the destination of the signal, and the destination address is composed of:
   (a) a channel address indicating a channel to which said separation means corresponds; and
   (b) a separation means address indicating whether or not said separation means is to be used for separating the signal and for outputting the separated signal to the sub-transmission path,
   wherein when outputting a signal to an output terminal of said n output terminals corresponding to a channel to which said separation means also corresponds, said switch means attaches effectiveness information to the signal, indicating that the destination address of the signal is effective, and
   wherein said separation means determines, in accordance with the separation means address, whether or not to separate a signal having the effectiveness information indicating the separation means address is effective.

86. A concentrator according to claim 79, wherein said switch means connects each of said n input terminals with a respectively non-corresponding one of said n output terminals.

87. A concentrator according to claim 86, wherein the signal has a destination address indicating the destination of the signal, and
   when outputting a signal to an output terminal of said n output terminals corresponding to a channel to which said separation means also corresponds, said switch means attaches effectiveness information to the signal, indicating that the destination address of the signal is effective.

88. A concentrator according to claim 86, wherein the signal has a destination address indicating the destination of the signal, and the destination address is composed of:
   (a) a channel address indicating a channel to which said separation means corresponds; and
   (b) a separation means address indicating whether or not said separation means is to be used for separating the signal and for outputting the separated signal to the sub-transmission path, and
   wherein said separation means determines, in accordance with the separation means address, whether or not to separate a signal.

89. A concentrator according to claim 86, wherein the signal has a destination address indicating the destination of the signal, and the destination address is composed of:
   (a) a channel address indicating a channel to which said separation means corresponds; and
   (b) a separation means address indicating whether or not said separation means is to be used for separating the signal and for outputting the separated signal to the sub-transmission path,
   wherein when outputting a signal to an output terminal of said n output terminals corresponding to a channel to which said separation means also corresponds, said switch means attaches effectiveness information to the signal, indicating that the destination address of the signal is effective, and
   wherein said separation means determines, in accordance with the separation means address, whether or not to separate a signal having the effectiveness information indicating the separation means address is effective.

90. A concentrator according to claim 79, further comprising insertion means, corresponding to a channel of the plurality of channels in the multi-channel transmission path, for inserting a signal on the channel.

91. A communication method for use in a network system for effecting communication utilizing a multi-channel transmission path consisting of a plurality of channels numbering n in total, the system comprising
   (a) switch means comprising
      (1) n input terminals respectively corresponding to the plurality of channels and
      (2) n output terminals respectively corresponding to the plurality of channels, for selectively delivering a signal inputted from any of the n input terminals to one of the n output terminals corresponding to a same or different channel of the plurality of channels,
   (b) separation means corresponding to at least one of the plurality of channels for determining whether or not to separate a desired signal therefrom and for outputting the separated signal to a sub-transmission path connected to the separation means, and (c) insertion means for inserting a signal on each channel of the multi-channel transmission path, said method comprising the steps of:

inserting, by the insertion means, a signal having destination information into a channel of the plurality of channels of the multi-channel transmission path;

delivering, by the switch means, the signal having the destination information to a channel among the plurality of channels corresponding to the destination information; and separating, in the separation means, the signal having the destination information, in accordance with the destination information.

92. A method according to claim 91, wherein the destination information is composed of:

(a) channel information indicating a channel to which the separation means corresponds; and (b) separation means information indicating whether or not the separation means is to be used for separating the signal and for outputting the separated signal to the sub-transmission path, wherein the switch means determines an output channel in accordance with the channel information, and wherein the separation means determines, in accordance with the separation means information, whether or not to separate the signal having the destination information.

93. A method according to claim 92, wherein when outputting a signal to an output terminal of the n output terminals corresponding to a channel to which the separation means also corresponds, the switch means attaches effectiveness information to the signal, indicating that the destination address of the signal is effective, and wherein the separation means determines, in accordance with the separation means information, whether or not to separate the signal having the effectiveness information that the separation means information is effective.

94. A method according to claim 91, wherein the switch means delivers the signal having the destination information from an input terminal of the n input terminals to an output terminal of the n output terminals corresponding to a different channel of the plurality of channels.

95. A method according to claim 94, wherein the destination information is composed of:

(a) channel information indicating a channel to which the separation means corresponds; and (b) separation means information indicating whether or not the separation means is to be used for separating the signal and for outputting the separated signal to the sub-transmission path, wherein when outputting a signal to an output terminal of the n output terminals corresponding to a channel to which the separation means also corresponds, the switch means attaches effectiveness information to the signal, indicating that the destination address of the signal is effective, and wherein the separation means determines, in accordance with the separation means information, whether or not to separate the signal having the effectiveness information that the separation means information is effective.

96. A communication method for use in a network system for effecting communication by connecting plural node devices utilizing a multi-channel transmission path consisting of a plurality of channels numbering n in total, wherein each node device comprises (a) switch means comprising
  (1) input terminals and
  (2) output terminals, for selectively delivering a signal inputted from any of the input terminals to any of the output terminals, and (b) separation means corresponding to at least two of the plurality of channels for determining whether or not to separate a signal therefrom and for outputting the separated signal to a sub-transmission path connected to the separation means, wherein the input terminals respectively correspond to the at least two of the plurality of channels to which the separation means also corresponds, and the output terminals respectively correspond to the at least two of the plurality of channels to which the separation means also corresponds, and wherein the switch means delivers a signal input from any of the input terminals to one of the output terminals corresponding to a same or different channel, and wherein the plurality of channels corresponding to the switch means are so arranged that all of the plurality of channels correspond to the switch means of one or another of the plural node devices, said method comprising the steps of:

transmitting, by a transmitting source, a signal having destination information to the node device connected to the transmitting source;

inserting the signal into a channel of the multi-channel transmission path;

delivering, by the switch means, in any one or plural node devices, the signal having the destination information to a channel of the plurality of channels corresponding to the destination information; and separating, in the separation means, the signal having the destination information, in accordance with the destination information.

97. A method according to claim 96, wherein the destination information is composed of:

(a) channel information indicating a channel to which the separation means corresponds; and (b) separation means information indicating whether or not the separation means is to be used for separating the signal and for outputting the separated signal to the sub-transmission path, wherein the switch means determines an output channel in accordance with the channel information, and wherein the separation means determines, in accordance with the separation means information, whether or not to separate the signal having the destination information.

98. A method according to claim 97, wherein when outputting a signal to an output terminal of the output terminals corresponding to a channel to which the separation means also corresponds, the switch means attaches effectiveness information to the signal, indicating that the destination address of the signal is effective, and wherein the separation means determines, in accordance with the separation means information, whether or not to separate the signal having the effectiveness information that the separation means information is effective.

99. A network system for effecting communication utilizing a multi-channel transmission path consisting of a plurality of channels numbering n in total, said system comprising:

switch means comprising
- (a) n input terminals respectively corresponding to the plurality of channels and
- (b) n output terminals respectively corresponding to the plurality of channels, for selectively delivering a signal inputted from any of said n input terminals to one of said n output terminals corresponding to a same or different channel of the plurality of channels; and selecting means corresponding to at least one of the plurality of channels for selecting whether or not to output a signal separated from the respective channel to a sub-transmission path connected to said selecting means.

100. A network system for effecting communication by connecting plural node devices utilizing a multi-channel transmission path consisting of a plurality of channels, numbering n in total, wherein each said node device comprises
- (a) switch means comprising
  - (1) input terminals and
  - (2) output terminals, for selectively delivering a signal inputted from any of said input terminals to one of said output terminals, and
- (b) selecting means corresponding to at least two of the plurality of channels for selecting whether or not to output a signal separated from the respective channel to a sub-transmission path connected to said selecting means, wherein said input terminals respectively correspond to the at least two of the plurality of channels to which said selecting means also corresponds, and said output terminals respectively correspond to the at least two of the plurality of channels to which said selecting means also corresponds, and wherein said switch means selectively delivers a signal input from any of said input terminals to one of said output terminals corresponding to a same or different channel, wherein the plurality of channels corresponding to said switch means are arranged so that all of the plurality of channels correspond to said switch means of one or another of said plural node devices.

101. A node device for use in a network system for effecting communication utilizing a multi-channel transmission path consisting of a plurality of channels numbering n in total, said system comprising switch means comprising
- (a) n input terminals respectively corresponding to the plurality of channels and
- (b) n output terminals respectively corresponding to the plurality of channels, for selectively delivering a signal inputted from any of said n input terminals to one of said n output terminals corresponding to a same or different channel of the plurality of channels, said node device comprising:

selecting means corresponding to each of the plurality of channels for selecting whether or not to output a signal separated from the respective channel to a sub-transmission path connected to said selecting means.

102. A node device for use in a network system for effecting communication utilizing a multi-channel transmission path consisting of a plurality of channels numbering n in total, said node device comprising:
switch means comprising
- (a) n input terminals respectively corresponding to the plurality of channels and
- (b) n output terminals respectively corresponding to the plurality of channels, for selectively delivering a signal inputted from any of said n input terminals to one of said n output terminals corresponding to a same or different channel of the plurality of channels; and selecting means corresponding to each of the plurality of channels for selecting whether or not to output a signal separated from the respective channel to a sub-transmission path connected to said selecting means.

103. A node device for use in a network system for effecting communication utilizing a multi-channel transmission path consisting of a plurality of channels numbering n in total, said system comprising switch means comprising
- (a) n input terminals respectively corresponding to the plurality of channels and
- (b) n output terminals respectively corresponding to the plurality of channels, for selectively delivering a signal inputted from any of said n input terminals to one of said n output terminals corresponding to a same or different channel of the plurality of channels, said node device comprising:

selecting means corresponding to some but not all of the plurality of channels for selecting whether or not to output a signal separated from the respective channel to a sub-transmission path connected to said selecting means.

104. A node device for use in a network system for effecting communication by connecting, with a multi-channel transmission path consisting of a plurality of channels numbering n in total, plural node devices each accessing at least two of the plurality of channels in such a manner that all of the plurality of channels can be accessed by one or another of the plural node devices, said node devices each comprising:
switch means comprising
- (a) n input terminals respectively corresponding to the plurality of channels and
- (b) n output terminals respectively corresponding to the plurality of channels, for selectively delivering a signal inputted from any of said n input terminals to one of said n output terminals corresponding to a same or different channel of the plurality of channels; and selecting means corresponding to at least two of the plurality of channels for selecting whether or not to output a signal separated from the respective channel to a sub-transmission path connected to said selecting means.

105. A concentrator for use in a network system for effecting communication utilizing a multi-channel transmission path consisting of a plurality of channels numbering n in total, said concentrator comprising:
switch means comprising
- (a) n input terminals respectively corresponding to the plurality of channels and
- (b) n output terminals respectively corresponding to the plurality of channels, for selectively delivering a signal inputted from any of said n input terminals to one of said n output terminals corresponding to a same or different channel of the plurality of channels;

selecting means corresponding to each of the plurality of channels for selecting whether or not to output a signal separated from the respective channel to a sub-transmission path connected to said selection means; and said multi-channel transmission path.

106. A communication method for use in a network system for effecting communication utilizing a multi-channel transmission path consisting of a plurality of channels numbering n in total, the system comprising
  (a) switch means comprising
    (1) n input terminals respectively corresponding to the plurality of channels and
    (2) n output terminals respectively corresponding to the plurality of channels, for selectively delivering a signal inputted from any of the n input terminals to one of the n output terminals corresponding to a same or different channel of the plurality of channels, and
  (b) selecting means corresponding to at least two of the plurality of channels for selecting whether or not to output a signal separated from the respective channel to a sub-transmission path connected to the selecting means, and
  (c) insertion means for inserting a signal on each channel of the multi-channel transmission path, said method comprising the steps of:
    inserting, by the insertion means, a signal having destination information into a channel of the multi-channel transmission path;
    delivering, by the switch means, the signal having the destination information to a channel among the plurality of channels corresponding to the destination information; and
    selecting, in the selecting means, the signal having the destination information in accordance with the destination information.

107. A communication method for use in a network system for effecting communication utilizing a multi-channel transmission path consisting of a plurality of channels, said method comprising the steps of:
  inserting a signal having destination information into a channel of the plurality of channels, wherein the destination information is composed of
    (a) channel information indicating a channel from which the signal is to be outputted to a sub-transmission path and
    (b) position information indicating a position at which the signal is to be outputted to the sub-transmission path connected to the channel;
  delivering the signal inserted into the channel to a channel from which the signal is to be output to the sub-transmission path, in accordance with the channel information; and
  outputting the signal at the position at which the signal is to be output to the sub-transmission path, in accordance with the position information.

108. A node device for connection to a network in which communication is performed using a plurality of channels, said node device comprising:
  switch means comprising
    (a) plural input terminals corresponding to the plurality of channels and
    (b) plural output terminals corresponding to the plurality of channels, for performing switching to output a signal input from any of said plural input terminals to any of said plural output terminals; and
  separation means corresponding to at least one of the plurality of channels for separating a desired signal therefrom and for determining whether or not to output the separated signal to a sub-transmission path connected to said separation means.

109. A node device according to claim 108, wherein said switch means performs switching to output the signal input from any of said plural input terminals to one of said plural output terminals corresponding to a different channel of the plurality of channels.

110. A node device according to claim 108, wherein said switch means performs switching to output the signal input from any of said plural input terminals to one of said plural output terminals corresponding to the same channel.

* * * * *